(12) United States Patent
Schlesinger et al.

(10) Patent No.: US 8,905,060 B2
(45) Date of Patent: Dec. 9, 2014

(54) TAMPER-RESISTANT CAPS, ASSEMBLIES AND SYSTEMS FOR USE WITH A VALVE

(75) Inventors: Larry Schlesinger, Bahama, NC (US); Brian P. Rigney, Raleigh, NC (US)

(73) Assignee: Dill Air Controls Products, LLC, Oxford, NC (US)

( * ) Notice: Subject to any disclaimer, the term of this patent is extended or adjusted under 35 U.S.C. 154(b) by 457 days.

(21) Appl. No.: 13/354,870

(22) Filed: Jan. 20, 2012

(65) Prior Publication Data
US 2013/0186485 A1    Jul. 25, 2013

(51) Int. Cl.
*F16K 27/08* (2006.01)
*B65D 50/14* (2006.01)

(52) U.S. Cl.
USPC .................... 137/382; 13/315.41; 222/153.03

(58) Field of Classification Search
USPC ......... 137/382, 315.41; 222/153.03; 215/207; 220/210, 259.4, 725, 726
See application file for complete search history.

(56) References Cited

U.S. PATENT DOCUMENTS

| | | | | |
|---|---|---|---|---|
| 5,769,252 A | * | 6/1998 | Volpe | 215/207 |
| 6,082,564 A | * | 7/2000 | Trout | 215/207 |
| 6,152,165 A | * | 11/2000 | Fukuda | 137/315.41 |
| 6,612,455 B2 | | 9/2003 | Byrne et al. | |

* cited by examiner

*Primary Examiner* — Kevin Lee
(74) *Attorney, Agent, or Firm* — Jenkins, Wilson, Taylor & Hunt, P.A.

(57) ABSTRACT

Tamper-proof cap systems and methods for use with an access valve, such as a refrigeration access valve, are provided. A tamper-proof cap assembly for use with an access valve can include a cylindrical outer cap and a cylindrical inner cap, wherein the inner cap captively resides within and rotates freely within the outer cap. The inner cap of a tamper-proof cap assembly can threadingly receive the threaded end of an access valve. A tamper-proof cap system can include a tamper-proof cap assembly and a tool for manipulating the inner cap such that a user with the tool can manipulate the tamper-proof cap and screw it onto or off of an access valve. Without the tool the tamper-proof cap cannot be removed from the access valve.

29 Claims, 14 Drawing Sheets

US 8,905,060 B2

TAMPER-RESISTANT CAPS, ASSEMBLIES AND SYSTEMS FOR USE WITH A VALVE

TECHNICAL FIELD

This presently disclosed subject matter relates to locks or devices for restricting access to an access valve. More specifically, the presently disclosed subject matter is directed to a tamper-proof cap assembly and system for deterring unauthorized access to a threaded cylindrical end of an access valve, on a mechanical system, such as an air conditioning system.

BACKGROUND

Closed mechanical systems containing gaseous or liquid substances often have access points or ports for accessing the gaseous or liquid substances therein and/or servicing the system. For example, pressurized tire and wheel assemblies often use a valve stem for deflating and inflating the tire. Likewise, refrigeration and air conditioning systems often employ a similar valve system which provides access to the refrigerant compound for purposes of servicing the refrigerant. These valves are known in the art as refrigeration access valves.

Refrigeration access valves can be accessed by removing or unscrewing the cap from the threaded cylindrical end of the valve. Such valve caps serve to cover and protect the center pin of the refrigeration access valve from damage, but do not prevent unauthorized access to the valve. Once the cap is removed from the valve the gaseous or liquid compound contained within the closed system can be accessed by manipulating the pin in the refrigeration access valve.

For purposes of safety and security, there is a need for a tamper proof cap for refrigeration access valves and the like to prevent unauthorized access to the contents of the mechanical system to which the valve is engaged. For example, refrigerant compounds containing hydrochlorofluorocarbons (HCFCs), commonly referred to by the trade name FREON®, can be extremely toxic to human beings and animals if inhaled. Unfortunately, a trend has emerged for people, particularly young people, to intentionally ingest, sniff, or inhale FREON® in an attempt to get high. The trend has become known as "FREON® huffing". Inhalation of FREON® is extremely dangerous and can cause severe medical complications, including death. People intent on inhaling FREON® can easily access the compound through refrigeration access valves on refrigeration or air conditioning systems. Even young adults and adolescents can readily remove a standard cap from a refrigeration access valve and gain access to FREON® in a refrigeration or air conditioning unit.

As such, a need exists for systems and methods for securing valves such as refrigeration access valves to prevent unauthorized access to the contents of the mechanical system to which the valve is engaged. A need exists for tamper proof cap assemblies and systems that are useable with existing refrigeration access valves and which prevents or deters unauthorized access thereto.

SUMMARY

It is an object of the presently disclosed subject matter to provide novel tamper proof caps and methods of use.

An object of the presently disclosed subject matter having been stated hereinabove, and which is achieved in whole or in part by the presently disclosed subject matter, this and other objects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 5A illustrates a cross sectional view of an outer cap and an inner cap of a tamper-proof cap assembly prior to their assembly, wherein the inner cap is receivable in the internal cavity of the outer cap. FIG. 5B is a cross sectional view of a tamper-proof cap assembly wherein the inner cap is matingly engaged with the outer cap, wherein the inner cap resides in the internal cavity of the outer cap. FIG. 5C is a cross sectional view of a tamper-proof cap assembly wherein the terminal ends of the sidewall of the outer cap have been crimped such that the inner cap captively resides in the interior cavity of the outer cap;

FIG. 7A is a perspective view of a tamper-proof cap system comprising a tamper-proof cap assembly and tool. FIGS. 7B and 7C are side views of the tamper-proof cap system illustrating the engagement of the tool with the tamper-proof cap assembly. FIG. 7B illustrates a tamper-proof cap system prior to the engagement of the tool with the assembly, wherein the assembly is shown in a cross-sectional view. FIG. 7C illustrates a tamper-proof cap system after engagement of the tool with the assembly, wherein the assembly is shown in a partial cut-away view.

FIGS. 9A and 9B are cross sectional and top views, respectively, of a second embodiment of a tamper-proof cap assembly according to the subject matter herein;

FIG. 12A illustrates a cross sectional view of an outer cap and an inner cap of a tamper-proof cap assembly prior to their assembly, wherein the inner cap is receivable in the internal cavity of the outer cap. FIG. 12B is a cross sectional view of a tamper-proof cap assembly wherein the inner cap is matingly engaged with the outer cap, wherein the inner cap resides in the internal cavity of the outer cap. FIG. 12C is a cross sectional view of a tamper-proof cap assembly wherein the terminal ends of the sidewall of the outer cap have been crimped such that the inner cap captively resides in the interior cavity of the outer cap;

FIG. 14A is a perspective view of a tamper-proof cap system comprising a tamper-proof cap assembly and tool. FIGS. 14B and 14C are side views of the tamper-proof cap system illustrating the engagement of the tool with the tamper-proof cap assembly. FIG. 14B illustrates a tamper-proof cap system prior to the engagement of the tool with the assembly, wherein the assembly is shown in a cross-sectional view. FIG. 14C illustrates a tamper-proof cap system after engagement of the tool with the assembly, wherein the assembly is shown in a partial cut-away view

DETAILED DESCRIPTION

The subject matter disclosed herein provides tamper-proof cap assemblies and systems for restricting access to an access valve. More specifically, the presently disclosed subject matter is directed to tamper-proof cap assemblies and systems for deterring unauthorized access to a threaded cylindrical end of an access valve, such as a refrigeration access valve, on a mechanical system. In some aspects, the tamper-proof cap assemblies and systems provide a user the ability to secure an access valve from unauthorized access, while allowing the user to readily access the access valve.

The terms "access valve" and "refrigeration access valve" are used interchangeably throughout to refer to valves, ports, access valves, refrigeration access valves and the like. The presently disclosed tamper-proof cap systems can be used with an access valve commonly referred to as a refrigeration access valve. In addition to tube and tubeless tires, refrigeration access valves of varying shapes, sizes, diameters and configurations are used, among other things, on refrigeration and air conditioning systems to allow servicing, including recharging with refrigerant; by plumbers conducting leak-down pressure tests on pipe installations; as a bleeding and test port on the fuel rail of some fuel injected engines; in the buoyancy compensator inflators of SCUBA systems; and in high-pressure hydraulic systems on aircraft. As would be appreciated by one of ordinary skill in the art, a refrigeration access valve comprises an externally threaded hollow cylindrical metal tube, typically of brass. In the center of the exterior end is a metal pin pointing along the axis of the tube, and the pin's end is approximately flush with the end of the valve body. A refrigeration access valve also includes a valve cap that can be threaded onto the threaded end of the valve.

A valve cap is important on a refrigeration access valve because if one is not fitted dirt and water can enter the threaded end of the valve, potentially jamming it or contaminating the sealing surfaces and causing a leak. While traditional valve caps protect the valve from contamination and damage, they do not prevent access to the valve by unauthorized users. The presently disclosed tamper-proof cap systems are designed to be used in place of a traditional valve cap, with the purpose of protecting the valve as well as preventing unauthorized access.

Figure 1:
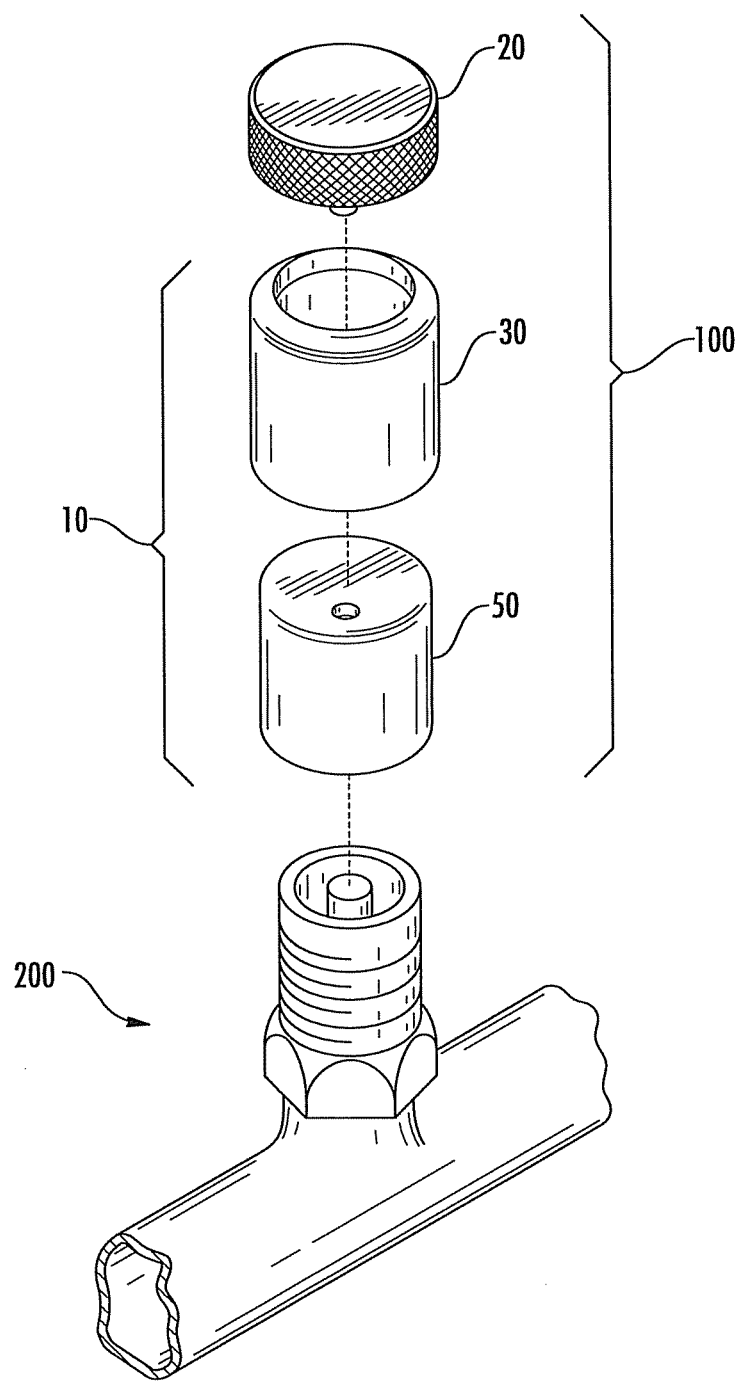
FIG. 1 is an exploded view of a first embodiment of a tamper-proof cap system and access valve.

Referring to FIG. 1, the presently disclosed subject matter provides in a first embodiment a tamper-proof cap system 100 for use with a threaded access valve 200, such as a refrigeration access valve. As shown in the exploded view of FIG. 1, tamper-proof cap system 100 can comprise a tamper-proof cap assembly 10 and a tool 20. Tamper-proof cap assembly 10 can further comprise an outer cap 30 and inner cap 50. Inner cap 50 can threadingly engage, i.e. screw onto/off of, access valve 200. In some aspects, inner cap 50 captively resides inside outer cap 30, wherein inner cap 50 and outer cap 30 rotate freely and independently of one another, such that inner cap 50 cannot be threaded onto or off of access valve 200 without the use of tool 20. Thus, contrary to a traditional refrigeration access valve cap, a tamper-proof cap assembly 10 of the presently disclosed subject matter cannot be removed by an unauthorized user without tool 20.

Figure 2A:
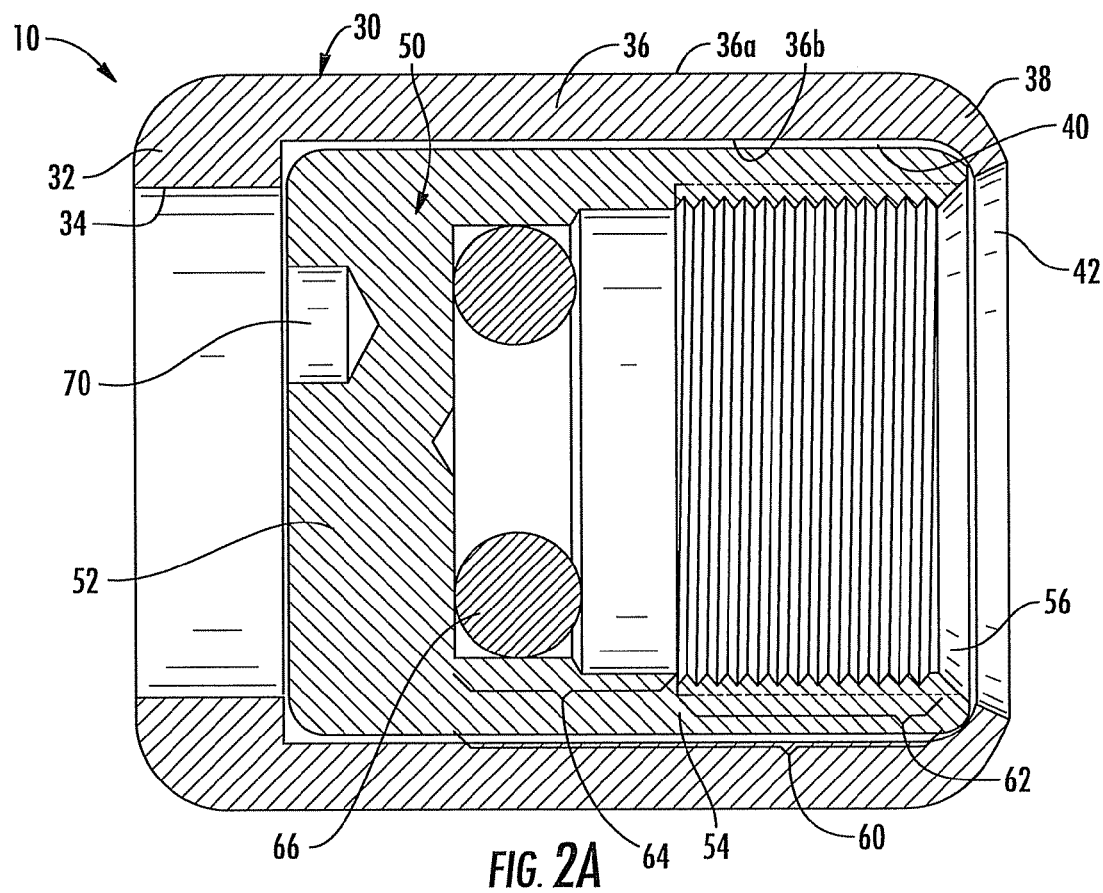
FIGS. 2A and 2B are cross sectional and top views, respectively, of a first embodiment of a tamper-proof cap assembly according to the subject matter herein.
Figure 2B:
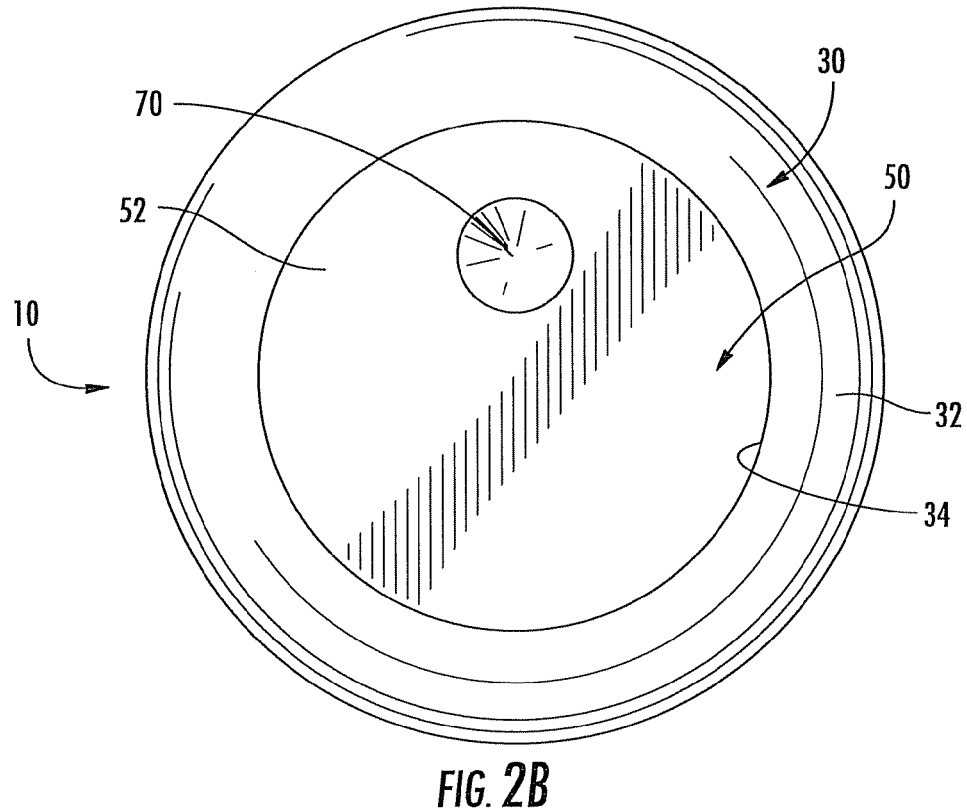

Referring to FIGS. 2A and 2B, a first embodiment of a tamper-proof cap assembly 10 of the presently disclosed subject matter can comprise an outer cap 30 and an inner cap 50. Both outer cap 30 and an inner cap 50 can comprise substantially cylindrical structures (see FIG. 2B providing a top view of tamper-proof cap assembly 10). As illustrated in the cross sectional view of FIG. 2A, inner cap 50 can captively reside in outer cap 30, whereby outer cap 30 can rotate freely around inner cap 50. Inner cap 50 can threadingly receive a threaded end of an access valve, such as a refrigeration access valve (see access valve 200 in FIG. 1). Once fitted to an access valve, tamper-proof cap assembly 10 can resist removal by an unauthorized user since rotation of outer cap 30 will not cause inner cap 50 to become unthreaded from the access valve.

Figure 3A:
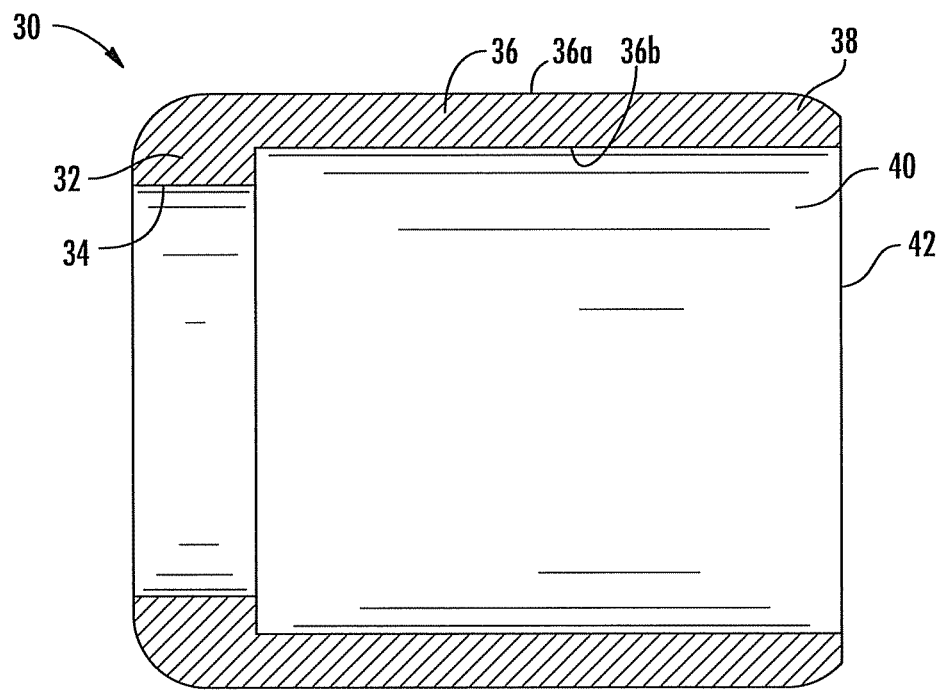
FIGS. 3A and 3B are cross sectional and top views, respectively, of a first embodiment of an outer cap of a tamper-proof cap assembly according to the subject matter herein.
Figure 3B:
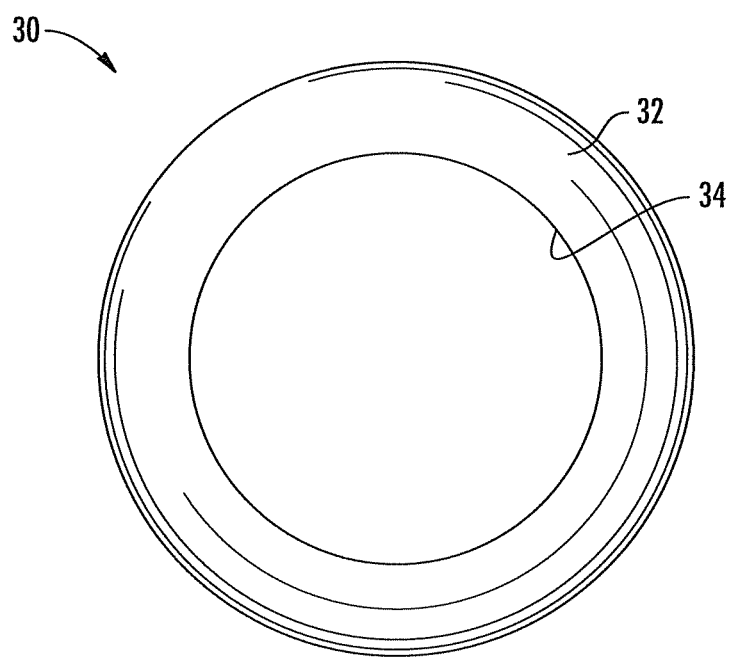

Referring to FIGS. 2A, 3A and 3B, a first embodiment of a tamper-proof cap assembly 10 of the presently disclosed subject matter can comprise an outer cap 30 having an upper endwall 32 with an opening 34 therein, a sidewall 36 extending down from the upper endwall 32 to an open lower end 42, the open lower end 42 leading into an internal cylindrical cavity 40 defined by the sidewall 36 having a cylindrical interior surface 36b. In some aspects, outer cap 30 can comprise a cylindrical structure with sidewalls 36 forming a cylindrical wall extending from a substantially flat or planar upper endwall 32, as illustrated in FIG. 3B. In some aspects, the exterior surface 36a of sidewall 36 of outer cap 30 can form a substantially cylindrical structure. In some aspects, the exterior surface 36a of sidewall 36 of outer cap 30 can form a hexagon, octagon or any other polygonal structure. Conversely, the interior surface 36b of sidewall 36 of outer cap 30 can be cylindrical, thereby forming internal cylindrical cavity 40. In some embodiments, the terminal end 38 of sidewall 36 of outer cap 30 can be tapered such that the thickness of the sidewall 36 at terminal end 38 is less than the thickness at other points along sidewall 36.

Outer cap 30 can comprise a substantially cylindrical structure having an outside diameter of about 0.5 inches to about 1.0 inches. In some aspects, the outside diameter of outer cap 30 is about 0.5 inches, 0.55 inches, 0.6 inches, 0.65 inches, 0.7 inches, 0.75 inches, 0.8 inches, 0.85 inches, 0.9 inches, 0.95 inches or 1.0 inches. In some aspects, the outside diameter of outer cap 30 is about 0.625 inches.

Outer cap 30 can comprise a substantially cylindrical structure having an overall height (from the top of upper endwall 32 to the bottom of open lower end 42) of about 0.5 inches to about 2.0 inches. In some aspects, the height of outer cap 30 is about 0.5 inches, 0.55 inches, 0.6 inches, 0.65 inches, 0.7 inches, 0.75 inches, 0.8 inches, 0.85 inches, 0.9 inches, 0.95 inches, 1.0 inches, 1.1 inches, 1.2 inches, 1.3 inches, 1.4 inches, 1.5 inches, 1.6 inches, 1.7 inches, 1.8 inches, 1.9 inches, or 2.0 inches. In some aspects, the height of outer cap 30 is about 0.665 inches.

The thickness of sidewall 36 of outer cap 30 can range from about 0.01 inches to about 0.1 inches. In some aspects, the thickness of sidewall 36 is about 0.01 inches, 0.015 inches, 0.02 inches, 0.025 inches, 0.03 inches, 0.035 inches, 0.04 inches, 0.045 inches, 0.05 inches, 0.055 inches, 0.06 inches, 0.065 inches, 0.07 inches, 0.075 inches, 0.08 inches, 0.085 inches, 0.09 inches, 0.095 inches or 0.1 inches. In some aspects, the thickness of sidewall 36 is about 0.055 inches.

Upper endwall 32 of outer cap 30 can for example have a thickness of about 0.02 inches to about 0.08 inches. In some aspects, the thickness of upper endwall 32 of outer cap 30 can range from about 0.02 inches, 0.025 inches, 0.03 inches, 0.035 inches, 0.04 inches, 0.045 inches, 0.05 inches, 0.055 inches, 0.06 inches, 0.065 inches, 0.07 inches, 0.075 inches or 0.08 inches. In some aspects, the thickness of upper endwall 32 of outer cap 30 is about 0.05 inches.

Sidewall 36 of outer cap 30 can for example extend about 0.4 inches to about 0.9 inches from upper endwall 32. In some aspects, sidewall 36 of outer cap 30 can extend about 0.4 inches, 0.45 inches, 0.5 inches, 0.55 inches, 0.6 inches, 0.65 inches, 0.7 inches, 0.75 inches, 0.8 inches, 0.85 inches, or 0.9 inches from upper endwall 32. In some aspects, sidewall 36 of outer cap 30 can extend about 0.615 inches from upper endwall 32.

Internal cavity 40 of outer cap 30 can be substantially cylindrical and have for example a diameter of about 0.3 inches to about 0.8 inches. In some aspects, the diameter of internal cavity 40 is about 0.3 inches, 0.35 inches, 0.4 inches, 0.45 inches, 0.5 inches, 0.55 inches, 0.6 inches, 0.65 inches, 0.7 inches, 0.75 inches or 0.8 inches. In some aspects, the interior diameter of internal cavity 40 is about 0.515 inches.

Continuing with FIGS. 2A, 3A and 3B, upper endwall 32 of outer cap 30 can comprise a substantially flat or planar surface from which sidewall 36 extends. In some aspects, opening 34 in upper endwall 32 of outer cap 30 can comprise a circular opening as illustrated in FIGS. 3A and 3B. In some aspects, opening 34 in upper endwall 32 of outer cap 30 can extend through upper endwall 32 such that interior cavity 40 is accessible through opening 34 of upper endwall 32. In some aspects, the diameter of opening 34 is less than the diameter of internal cavity 40. In some aspects, the diameter of opening 34 can range from about 0.2 inches to about 0.6 inches. In some aspects, the diameter of opening 34 can range from about 0.2 inches, 0.25 inches, 0.3 inches, 0.35 inches, 0.4 inches, 0.45 inches, 0.5 inches, 0.55 inches, or 0.6 inches. In some aspects, the diameter of opening 34 is about 0.44 inches.

Figure 4A:
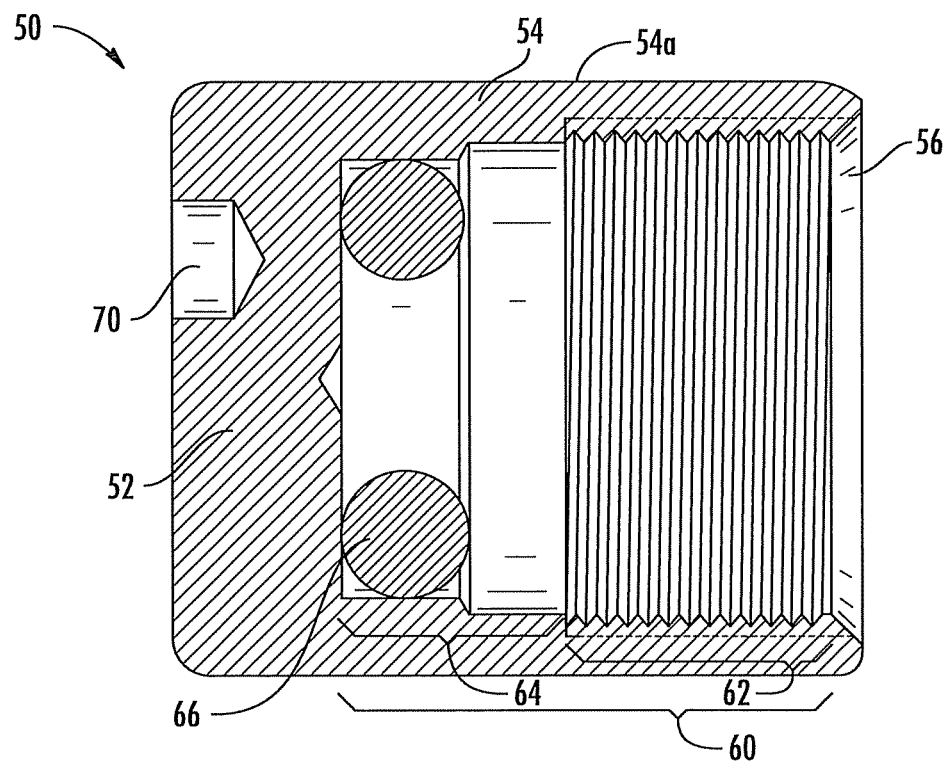
FIGS. 4A and 4B are cross sectional and top views, respectively, of a first embodiment of an inner cap of a tamper-proof cap assembly according to the subject matter herein.
Figure 4B:
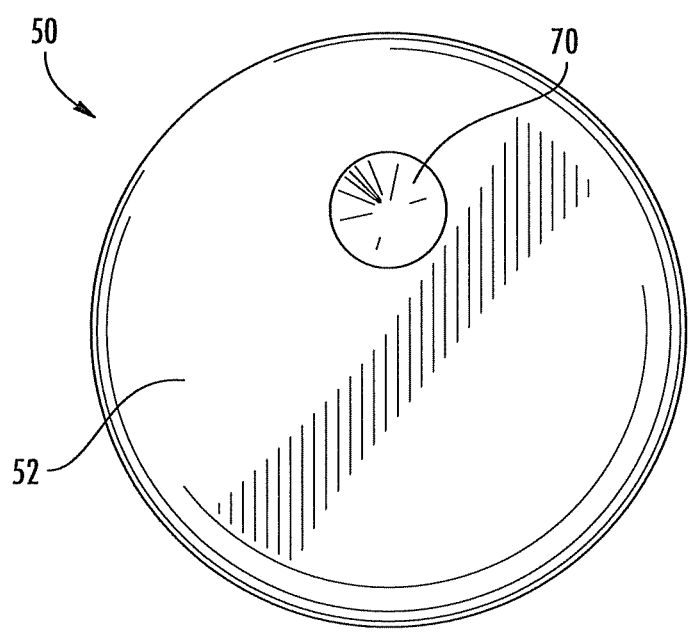

Referring to FIGS. 2A, 4A and 4B, a tamper-proof cap assembly 10 can further comprise a cylindrical inner cap 50 having an upper endwall 52, a cylindrical sidewall 54 extending down from the upper endwall 52 to an open lower end 56, the open lower end 56 leading to an internal cavity 60 defined by sidewall 54, wherein internal cavity 60 can comprise a threaded portion 62 capable of threadingly receiving a threaded cylindrical end of an access valve 200 (e.g. a refrigeration access valve, see FIG. 1). In some aspects, inner cap 50 can further comprise keyhole 70, wherein keyhole 70 is a recessed cavity in upper endwall 52, wherein keyhole 70 is radially off-set from the center of upper endwall 52 of inner cap 50 (see top view of inner cap 50 in FIG. 4B). In some aspects, internal cavity 60 of inner cap 50 can further comprise a headspace portion 64 extending above threaded portion 62. In some aspects, headspace 64 can optionally comprise O-ring 62.

In some aspects, the exterior surface 54a of sidewall 54 of inner cap 50 can form a substantially cylindrical structure. In some aspects, inner cap 50 can comprise a substantially cylindrical structure having a diameter and height less than the diameter and depth of interior cavity 40 of outer cap 30. In some aspects, the size (height and diameter) of inner cap 50 is substantially similar to, but yet slightly smaller than the size (diameter and depth) of interior cavity 40 of outer cap 30. The difference in size of inner cap 50 and interior cavity 40 of outer cap 30 allows inner cap 50 to captively reside in interior cavity 40. Further, the difference in size of inner cap 50 and interior cavity 40 of outer cap 30 can provide for a radial clearance between exterior surface 54a of sidewall 54 of inner cap 50 and interior surface 36b of sidewall 36 of outer cap 30, thereby allowing inner cap 50 to rotate freely within interior cavity 40 and independent of outer cap 30. The radial clearance between exterior surface 54a of sidewall 54 of inner cap 50 and interior surface 36b of sidewall 36 of outer cap 30 can for example range from about 0.005 to about 0.015 inches. In some embodiments, the radial clearance between exterior surface 54a of sidewall 54 of inner cap 50 and interior surface 36b of sidewall 36 of outer cap 30 can be about 0.005 inches, about 0.010 inches, or about 0.015 inches.

Inner cap 50 can comprise a substantially cylindrical structure having for example an outside diameter of about 0.3 inches to about 0.8 inches. In some aspects, the outside diameter of inner cap 50 can be about 0.3 inches, 0.35 inches, 0.4 inches, 0.45 inches, 0.5 inches, 0.55 inches, 0.6 inches, 0.65 inches, 0.7 inches, 0.75 inches or 0.8 inches. In some aspects, the outside diameter of outer cap 30 is about 0.4985 inches to about 0.5015 inches.

Inner cap 50 can comprise a substantially cylindrical structure having for example an overall height (from the top of upper endwall 52 to the bottom of open lower end 56) of about 0.3 inches to about 0.9 inches. In some aspects, the height of inner cap 50 is about 0.3 inches, 0.35 inches, 0.4 inches, 0.45 inches, 0.5 inches, 0.55 inches, 0.6 inches, 0.65 inches, 0.7 inches, 0.75 inches, 0.8 inches, 0.85 inches or 0.9 inches. In some aspects, the height of inner cap 50 is about 0.575 inches.

The thickness of sidewall 54 of inner cap 50 can range from about 0.01 inches to about 0.1 inches. In some aspects, the thickness of sidewall 54 is about 0.01 inches, 0.015 inches, 0.02 inches, 0.025 inches, 0.03 inches, 0.035 inches, 0.04 inches, 0.045 inches, 0.05 inches, 0.055 inches, 0.06 inches, 0.065 inches, 0.07 inches, 0.075 inches, 0.08 inches, 0.085 inches, 0.09 inches, 0.095 inches or 0.1 inches. In some aspects, the thickness of sidewall 54 of inner cap 50 is variable depending on the structure of internal cavity 60. In some aspects, the thickness of sidewall 54 is about 0.0485 inches to about 0.1265 inches.

Upper endwall 52 of inner cap 50 can for example have a thickness of about 0.05 inches to about 0.25 inches. In some aspects, the thickness of upper endwall 52 of inner cap 50 can range from about 0.05 inches, 0.1 inches, 0.15 inches, 0.2 inches, or 0.25 inches. In some aspects, the thickness of upper endwall 52 of inner cap 50 is about 0.14 inches.

Keyhole 70, a recessed cavity in upper endwall 52, can for example have a depth of about 0.05 inches to about 0.1 inches. In some aspects, the depth of keyhole 70 is less than the thickness of upper endwall 52 of inner cap 50. By way of example but not limitation, the depth of keyhole 70 can be about 0.05 inches, 0.06 inches, 0.07 inches, 0.8 inches, 0.09 inches or 0.1 inches. In some aspects, the depth of keyhole 70 is about 0.08 inches.

Keyhole 70 can have a diameter of about 0.05 inches to about 0.15 inches. By way of example and not limitation, the diameter of keyhole 70 can be about 0.05 inches, 0.06 inches, 0.07 inches, 0.8 inches, 0.09 inches, 0.1 inches, 0.11 inches, 0.12 inches, 0.13 inches, 0.14 inches or 0.15 inches. In some aspects, the diameter of keyhole 70 is about 0.099 inches. Moreover, in some aspects keyhole 70 can be radially off-set from the center of upper endwall 52 of inner cap 50. In some aspects, keyhole 70 can be offset from center by about 0.05 inches to about 0.15 inches. By way of example and not limitation, keyhole 70 can be offset from center by about 0.05 inches, 0.06 inches, 0.07 inches, 0.8 inches, 0.09 inches, 0.1 inches, 0.11 inches, 0.12 inches, 0.13 inches, 0.14 inches or 0.15 inches. In some aspects, keyhole 70 is offset from center by about 0.100 inches.

Sidewall 54 of inner cap 50 can for example extend about 0.3 inches to about 0.8 inches from upper endwall 52. In some aspects, sidewall 54 of inner cap 50 can extend about 0.3 inches, 0.35 inches, 0.4 inches, 0.45 inches, 0.5 inches, 0.55 inches, 0.6 inches, 0.65 inches, 0.7 inches, 0.75 inches, or 0.8 inches from upper endwall 52. In some aspects, sidewall 54 of inner cap 50 can extend about 0.435 inches from upper endwall 52.

Internal cavity 60 of inner cap 50 can be substantially cylindrical and have for example a diameter of about 0.25 inches to about 0.7 inches. In some aspects, the diameter of internal cavity 60 is about 0.25 inches, 0.3 inches, 0.35 inches, 0.4 inches, 0.45 inches, 0.5 inches, 0.55 inches, 0.6 inches, 0.65 inches, or 0.7 inches. In some aspects, the diameter of internal cavity 60 is about 0.45 inches. In some aspects, the diameter of internal cavity 60 is variable depending on the structure of internal cavity 60. In some aspects, the diameter of threaded portion 62 is sufficient to threadingly receive the threaded end of access valve 200, such as a refrigeration access valve (see FIG. 1). In some aspects, the diameter of threaded portion 62 and headspace portion 64 of internal cavity 60 are substantially similar. In some aspects, the diameter of threaded portion 62 is greater than that of headspace portion 64, wherein the diameter of headspace portion 64 is slightly tapered as compared to threaded portion 62, and/or decreases in diameter in a step-wise fashion (see FIG. 4A). In some aspects, the diameter of headspace portion 64 is variable and designed to accommodate O-ring 66.

Threaded portion 62 of internal cavity 60 can extend about 0.15 inches to about 0.35 inches into internal cavity 60, as measured from open lower end 56. In some aspects, threaded portion 62 of internal cavity 60 extends about 0.15 inches, 0.2 inches, 0.25 inches, 0.3 inches, or 0.35 inches into internal cavity 60, as measured from open lower end 56. In some aspects, threaded portion 62 of internal cavity 60 extends about 0.25 inches into internal cavity 60, as measured from open lower end 56. In some aspects, threaded portion 62 comprises sufficient threading to adequately receive the threaded end of access valve 200.

Headspace portion 64 of internal cavity 60 can comprise that portion of internal cavity 60 that is not threaded and that extends above threaded portion 62. In some aspects, headspace portion 64 can for example extend about 0.1 inches to about 0.3 inches above threaded portion 62. In some aspects, headspace portion 64 of internal cavity 60 extends about 0.15 inches, 0.15 inches, 0.2 inches, 0.25 inches or 0.3 inches above threaded portion 62. In some aspects, headspace portion 64 of internal cavity 60 extends about 0.185 inches above threaded portion 62. In some aspects, headspace portion 64 extends a sufficient distance above threaded portion 62 to adequately receive the terminal end of access valve 200. In some aspects, headspace portion 64 is capable of retaining O-ring 66 to which the terminal end of access valve 200 can abut when threadingly received into internal cavity 60, thereby creating an air-tight seal.

Figure 5A:
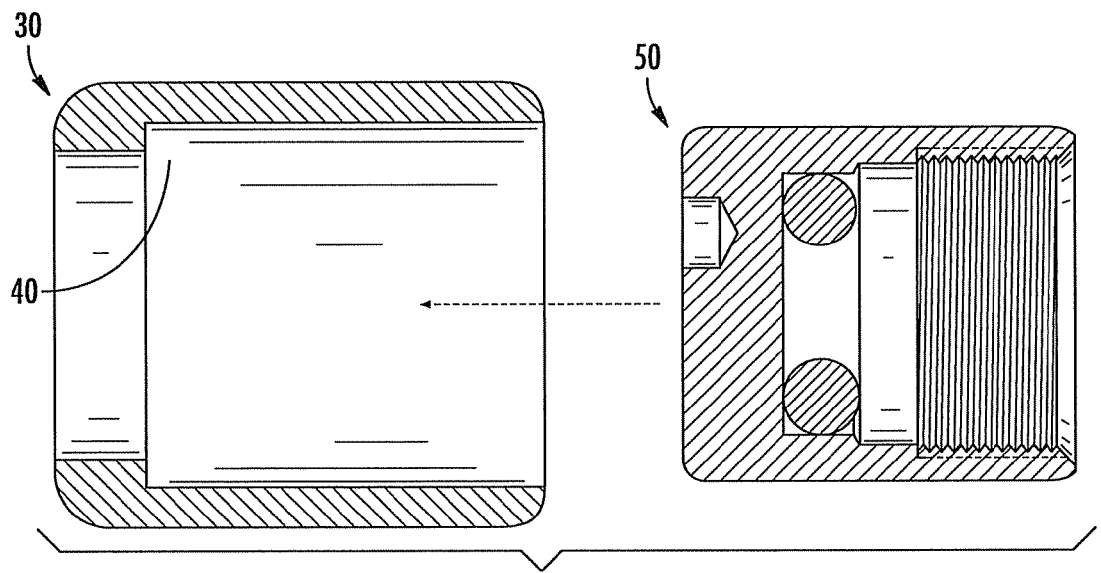
FIGS. 5A, 5B and 5C are cross sectional views of a first embodiment of a tamper-proof cap assembly as the components of the assembly are assembled according to the subject matter herein.
Figure 5B:
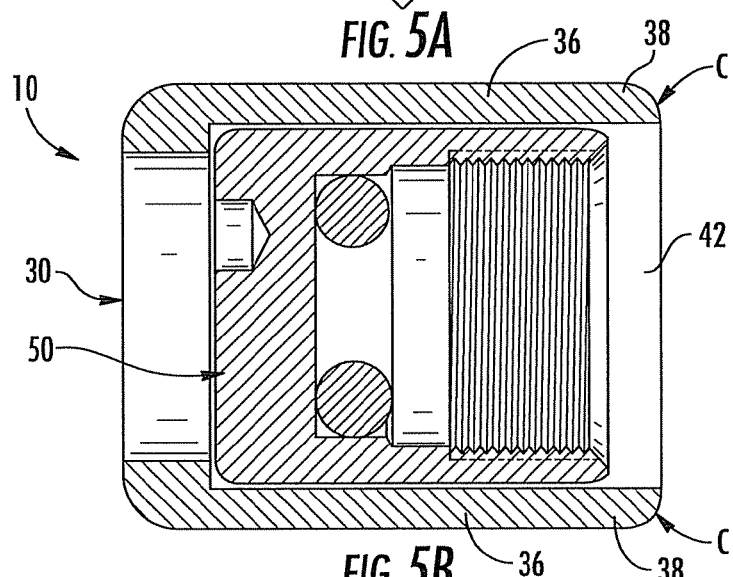
Figure 5C:
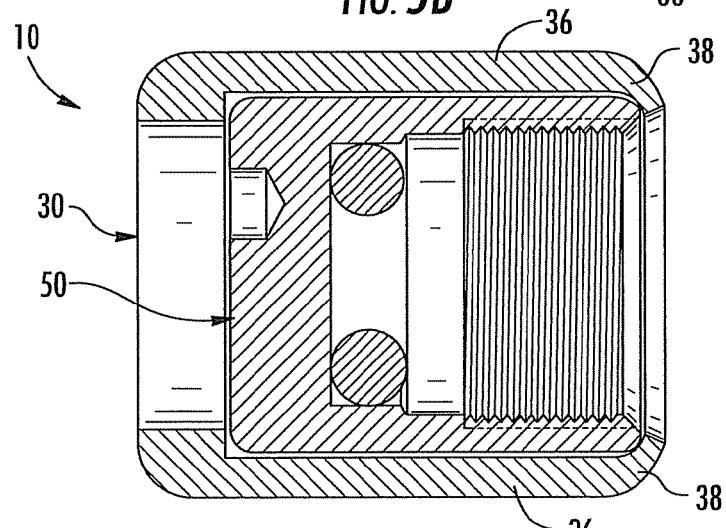

Referring to FIGS. 5A, 5B and 5C, outer cap 30 and inner cap 50 can be separate components that can be assembled into tamper-proof cap assembly 10. FIG. 5A illustrates a cross sectional view of outer cap 30 and an inner cap 50 prior to their assembly, wherein inner cap 50 is receivable in internal cavity 40 of outer cap 50. FIG. 5B is a cross sectional view of tamper-proof cap assembly 10 wherein inner cap 50 has been inserted into internal cavity 40 of outer cap 30. Once inserted, terminal ends 38 of sidewalls 36 of outer cap 30 can be crimped C so as to enclose open lower end 42, thereby captively retaining inner cap 50 within internal cavity 40 of outer cap 30. FIG. 5C is a cross sectional view of tamper-proof cap assembly 10 wherein terminal ends 38 of sidewalls 36 have been crimped inward sufficient to captively contain inner cap 50.

Figure 6A:
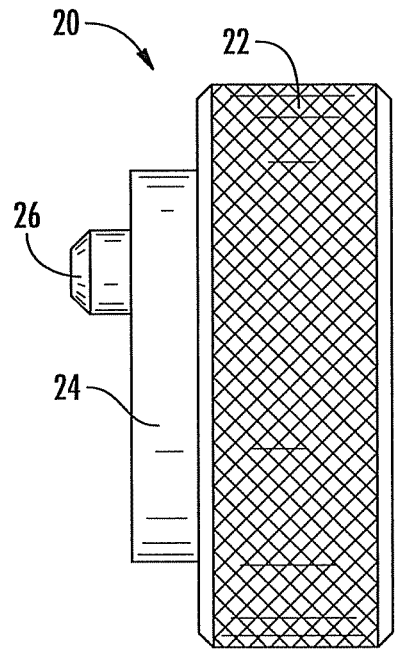
FIGS. 6A and 6B are side and top views, respectively, of a first embodiment of a tool of a tamper-proof cap system according to the subject matter herein.
Figure 6B:
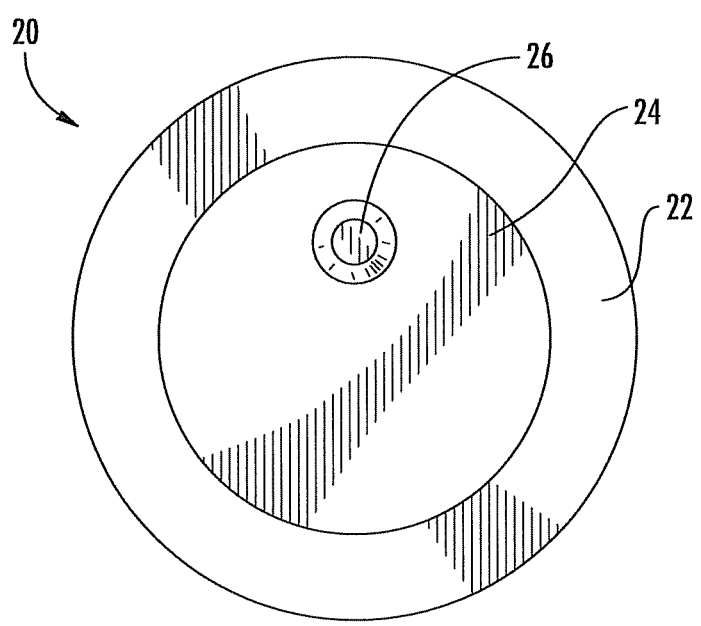

Referring now to FIGS. 6A and 6B, tool 20 can be a component of the presently disclosed tamper-proof cap system 100. Tool 20 is designed to allow an authorized user to manipulate or remove a tamper-proof cap assembly 10 installed on an access valve, such as a refrigeration access valve (see 200 in FIG. 1), and thereby access the access valve. Without tool 20, an unauthorized user is prevented from removing a tamper-proof cap assembly 10 installed on an access valve. As illustrated in FIGS. 6A and 6B, side and bottom views of tool 20, respectively, tool 20 can comprise a hub 22, a base 24, and a key pin 26. In some aspects, tool 20, comprising hub 22, base 24, and key pin 26, is a single unity piece.

In some aspects, hub 22 can comprise a circular structure designed to allow a user to grip tool 20 and apply a rotational force thereto. In some aspects, hub 22 can comprise a textured surface to improve the gripping ability of tool 20, to thereby assist a user in applying a rotational force thereto. In some aspects, hub 22 can form a hexagon, octagon or any other polygonal structure, such that tool 20 can be manipulated with a wrench, socket or other tool suitable for mechanically engaging a bolt-like structure. In some aspects, hub 22 can comprise a flat-head, philips-head, star, hex or other configuration suitable for use with a flat-head, philips-head, star, hex screwdriver or the like, such that tool 20 can be manipulated with a screwdriver.

In some aspects, hub 22 can for example have a diameter of about 0.5 inches to about 1.0 inches. In some aspects, the diameter of hub 22 of tool 20 is about 0.5 inches, 0.55 inches, 0.6 inches, 0.65 inches, 0.7 inches, 0.75 inches, 0.8 inches, 0.85 inches, 0.9 inches, 0.95 inches or 1.0 inches. In some aspects, the diameter of hub 22 of tool 20 is about 0.62 inches. In some aspects, the diameter of hub 22 of tool 20 is substantially similar to the outside diameter of outer cap 30. In some aspects, hub 22 can have a depth of about 0.3 inches to about 1.0 inches. In some aspects, the depth of hub 22 of tool 20 is about 0.3 inches, 0.4 inches, 0.5 inches, 0.6 inches, 0.7 inches, 0.8 inches, 0.9 inches or 1.0 inches. In some aspects, the depth of hub 22 of tool 20 is about 0.5 inches.

Figure 7A:
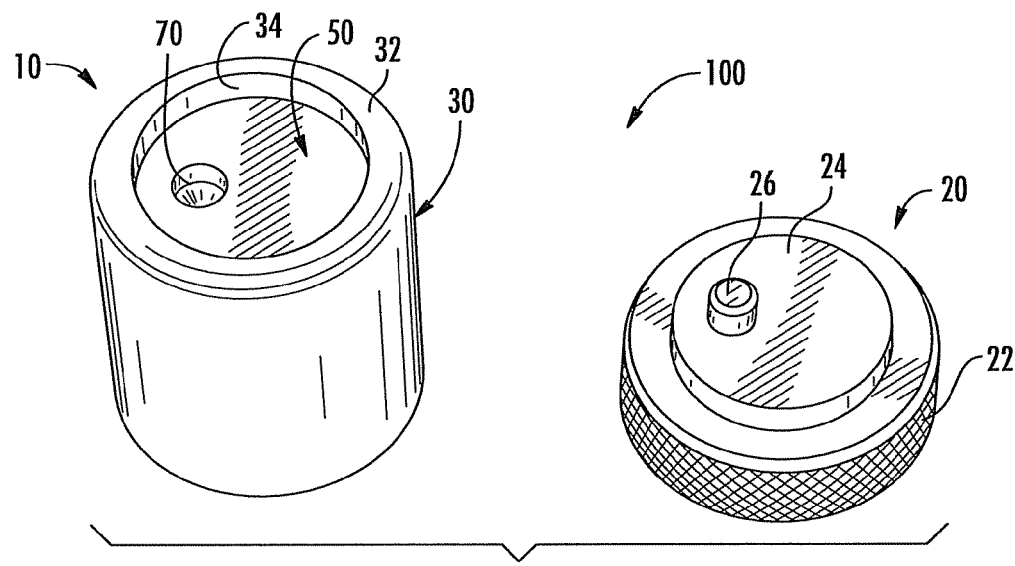
FIGS. 7A, 7B and 7C are views of a first embodiment of a tamper-proof cap system according to the subject matter herein.
Figure 7B:
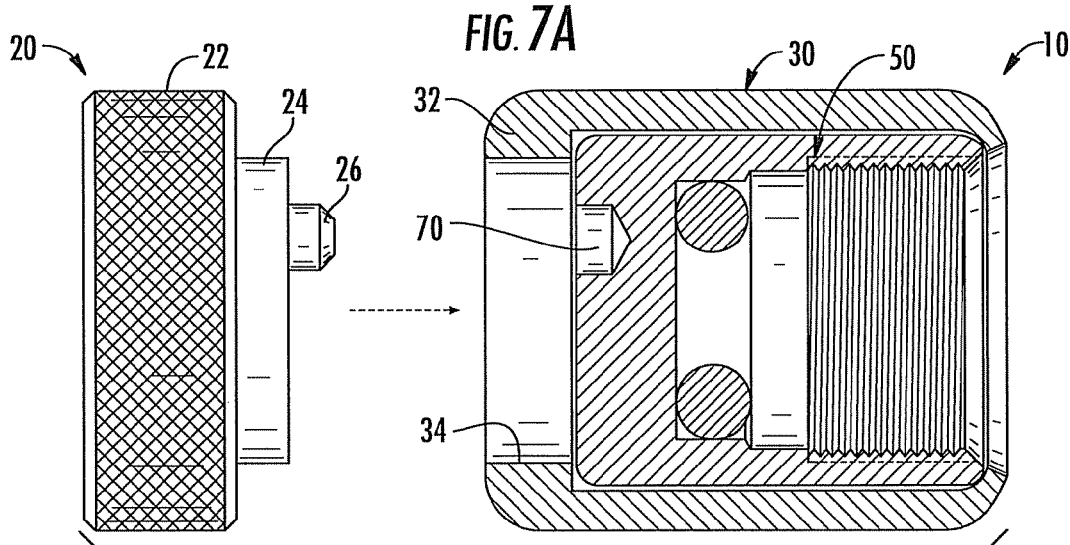
Figure 7C:
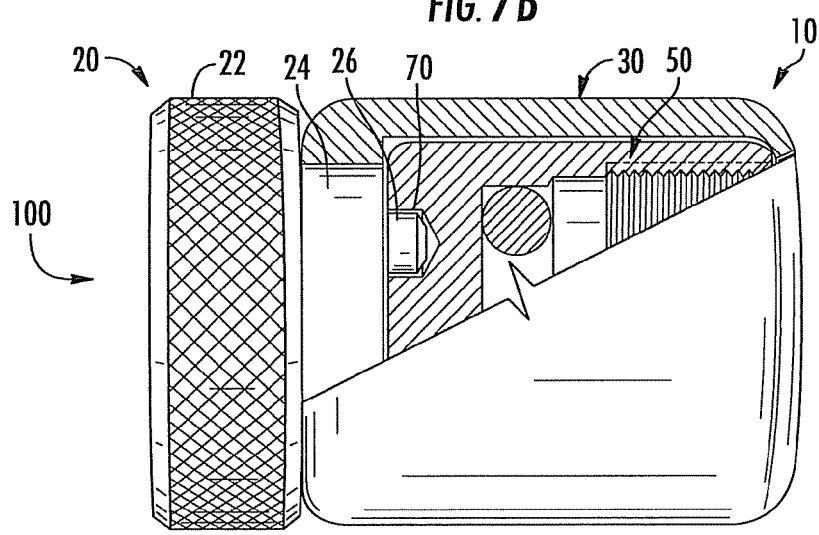

Base 24 of tool 20 is a cylindrical structure extending from hub 22, wherein base 24 is designed such that it can slidingly engage opening 34 of upper endwall 32 of outer cap 30 and abut against upper endwall 52 of inner cap 50 which is in communication with and accessible through opening 34, as illustrated in FIGS. 7B and 7C and discussed further hereinbelow. In some aspects, base 24 of tool 20 has a diameter less than the diameter of opening 34 of outer cap 30. In some aspects, base 24 of tool 20 has a diameter substantially similar to but slightly less than the diameter of opening 34 to thereby allow base 24 slidingly and securely engage opening 34. In some aspects, the diameter of base 24 can range from about 0.2 inches to about 0.6 inches. In some aspects, the diameter of base 24 can range from about 0.2 inches, 0.25 inches, 0.3 inches, 0.35 inches, 0.4 inches, 0.45 inches, 0.5 inches, 0.55 inches, or 0.6 inches. In some aspects, the diameter of base 24 is about 0.40 inches.

In some aspects, base 24 of tool 20 has a depth, i.e. extends from hub 22, substantially similar to the thickness of upper endwall 32 of outer cap 30, such that base 24 when slidingly engaged with opening 34 of upper endwall 32 abuts against upper endwall 52 of inner cap 50. See FIGS. 7B and 7C, both of which are discussed further hereinbelow. As such, in some aspects, base 24 of tool 20 has a depth of about 0.02 inches to about 0.08 inches. In some aspects, the depth of base 24 of tool 20 can be about 0.02 inches, 0.025 inches, 0.03 inches, 0.035 inches, 0.04 inches, 0.045 inches, 0.05 inches, 0.055 inches, 0.06 inches, 0.065 inches, 0.07 inches, 0.075 inches or 0.08 inches. In some aspects, the depth of base 24 of tool 20 is about 0.05 inches.

Continuing with FIGS. 6A and 6B, key pin 26 can comprise a pin-like or knob-like protrusion from base 24 of tool 20. In some aspects, key pin 26 can be radially offset from the center of base 24 of tool 20. In some aspects, key pin 26 is designed to match up with keyhole 70 in upper endwall 52 of inner cap 50. As such, key pin 26 can have a diameter and length substantially similar to but slightly less than the diameter and depth of keyhole 70, thereby allowing key pin 26 to slidingly engage keyhole 70 when tool 20 is applied to tamper-proof cap assembly 10. In some aspects, the length of key pin 26 can for example be about 0.015 inches to about 0.05 inches. By way of example and not limitation, the length of key pin 26 can be about 0.015 inches, 0.02 inches, 0.025 inches, 0.03 inches, 0.035 inches, 0.04 inches, 0.045 inches or 0.05 inches. In some aspects, the length of key pin 26 is about 0.03 inches. In some aspects, the terminal end of key pin 26 can be tapered, wherein the tapered end of key pin 26 facilitates the alignment of key pin 26 with keyhole 70 when tool 20 is applied to tamper-proof assembly 10.

FIGS. 7A, 7B and 7C illustrate the use of tool 20 with tamper-proof cap assembly 10. FIG. 7A, a perspective view of a tamper-proof cap system 100, shows the separate components comprising tamper-proof cap assembly 10 and tool 20. A user can engage tool 20 with tamper-proof cap assembly 10 by gripping hub 22 of tool 20 and sliding base 24 and key pin 26 of tool 20 into opening 34 of upper endwall 32 of outer cap 30, as illustrated in FIGS. 7B and 7C. Alignment of key pin 26 with keyhole 70, which is accessible through opening 34 of upper endwall 32 of outer cap 30, allows for base 24 to fully engage opening 34.

Upon application of tool 20 to tamper-proof cap assembly 10 base 24, tool 20 and inner cap 50 become mechanically engaged by virtue of base 24 abutting against upper endwall 52 of inner cap 50 through opening 34, and key pin 26 fitting into keyhole 70. See FIG. 7C, which illustrates tamper-proof cap system 100 after engagement of tool 20 with tamper-proof cap assembly 10 in a partial cut-away view. Once mechanically engaged, the application of a rotational force to tool 20 by a user translates the rotational force to inner cap 50 thereby allowing inner cap 50 to be manipulated, whereby inner cap 50 can be screwed onto or off of the threaded end of an access valve.

Notably, without the use of tool 20 a user cannot remove tamper-proof cap assembly 10 from an access valve. Because inner cap 50 captively resides within internal cavity 40 of outer cap 30 with a radial clearance there between, rotation of outer cap 30 fails to translate a rotational force to inner cap 50. Thus, manipulating outer cap 30 by an unauthorized user, without the use of tool 20, fails to unscrew inner cap 50 from an access valve. As such, tamper-proof cap assembly 10 prevents unauthorized access to an access valve, such as a refrigeration access valve (see 200 in FIG. 1), while allowing an authorized user to remove tamper-proof cap assembly 10 by using tool 20. Tamper-proof cap assembly 10 thereby provides a tamper-proof, tamper-resistant, secure or impenetrable barrier to an access valve.

In some aspects, tamper-proof cap system 100, including tamper-proof cap assembly 10 and tool 20, can be made of any suitable metal alloy, as would be appreciated by one of ordinary skill in the art. In some embodiments, a suitable metal alloy can include brass, nickel plated brass, chrome plated brass, aluminum or steel. In some aspects, tamper-proof cap system 100, including tamper-proof cap assembly 10 and tool 20, can be made of any suitable material as would be appreciated by one of ordinary skill in the art. In some embodiments, a suitable material can include a durable plastic or a durable polymer. In some aspects, the various components of tamper-proof cap system 100 can be made of different materials or alloys. In some aspects, the various components of tamper-proof cap system 100 are constructed of materials that impart desirable characteristics such as strength, durability, corrosion resistance, or the ability to withstand environmental conditions such as high and low temperatures, humidity and moisture. In some aspects, the various components of tamper-proof cap system 100 are constructed of materials that impart a desirable appearance or look.

Figure 8:
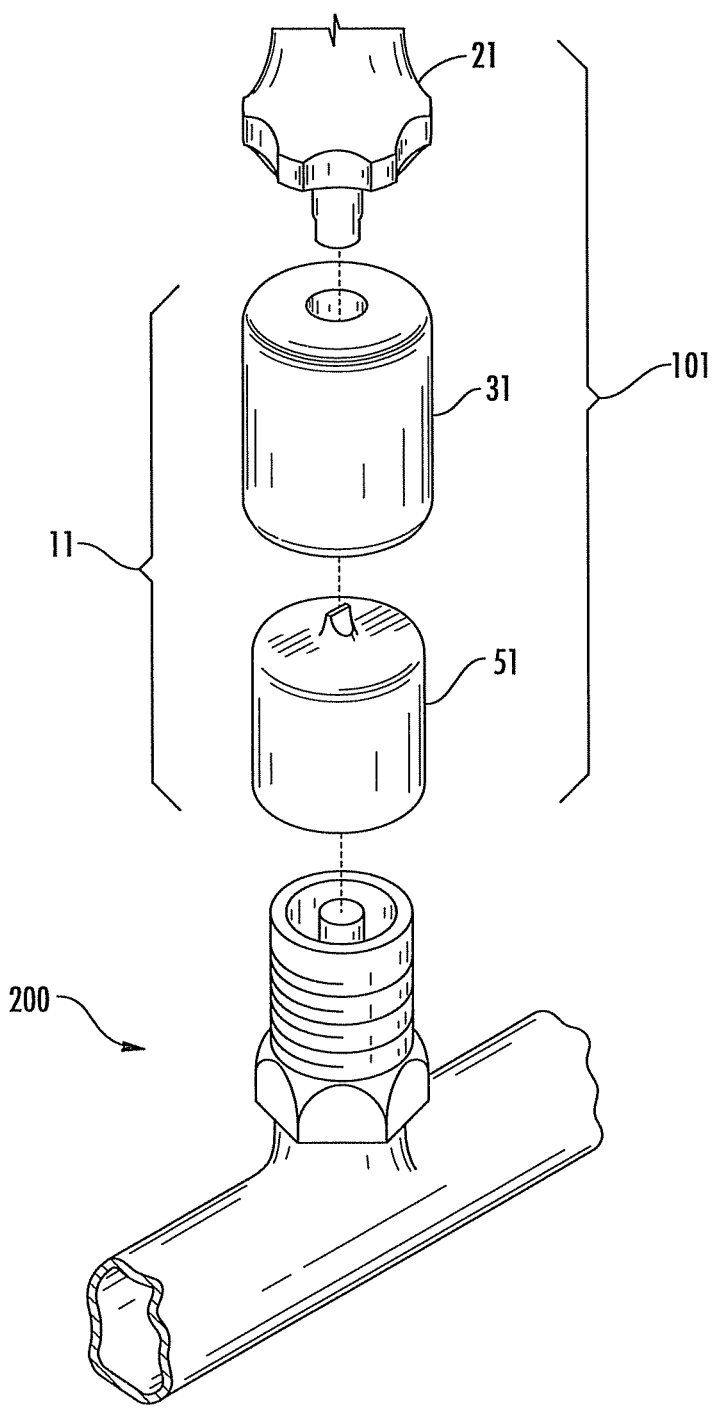
FIG. 8 is an exploded view of a second embodiment of a tamper-proof cap system and access valve.

Referring to FIG. 8, the presently disclosed subject matter provides in a second embodiment a tamper-proof cap system 101 for use with a threaded access valve 200, such as a refrigeration access valve. As shown in the exploded view of FIG. 8, tamper-proof cap system 101 can comprise a tamper-proof cap assembly 11 and a tool 21. Tamper-proof cap assembly 11 can further comprise an outer cap 31 and inner cap 51. Inner cap 51 can threadingly engage, i.e. screw onto/off of, access valve 200. In some aspects, inner cap 51 captively resides inside outer cap 31, wherein inner cap 51 and outer cap 31 rotate freely and independently of one another, such that inner cap 51 cannot be threaded onto or off of access valve 200 without the use of tool 21. Thus, contrary to a traditional refrigeration access valve cap, a tamper-proof cap assembly 11 of the presently disclosed subject matter cannot be removed by an unauthorized user without tool 21.

Figure 9B:
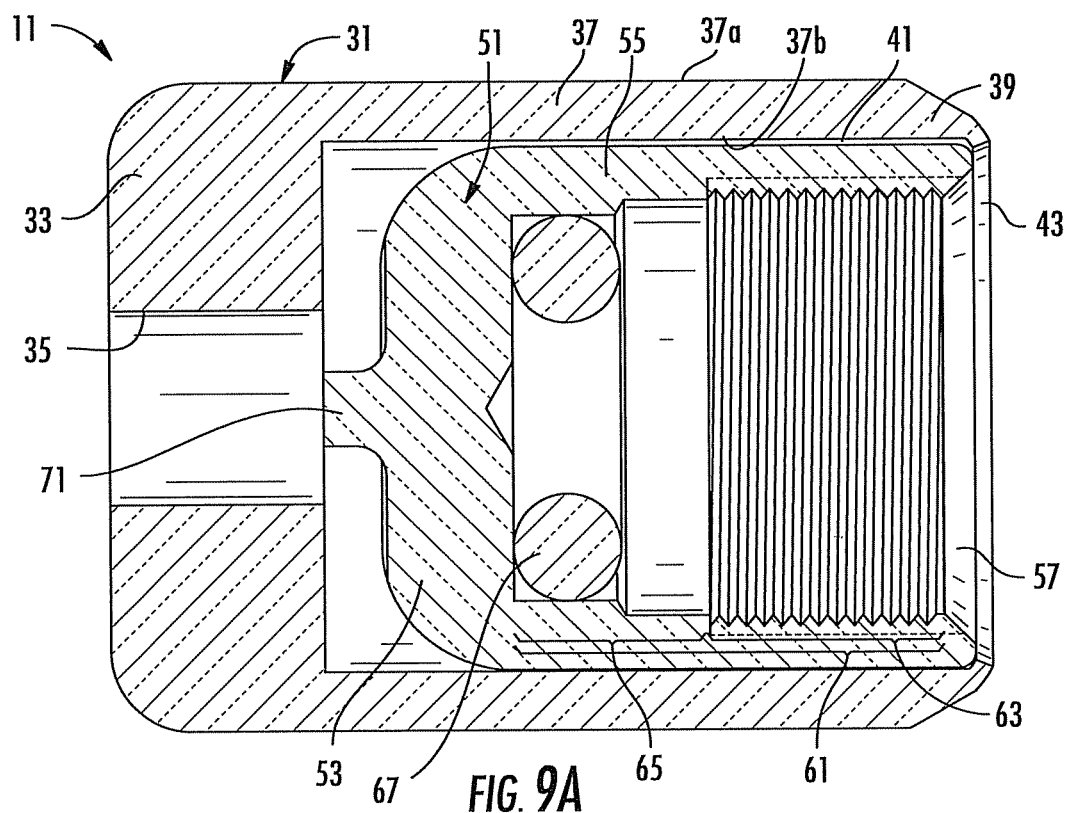
Figure 9B:
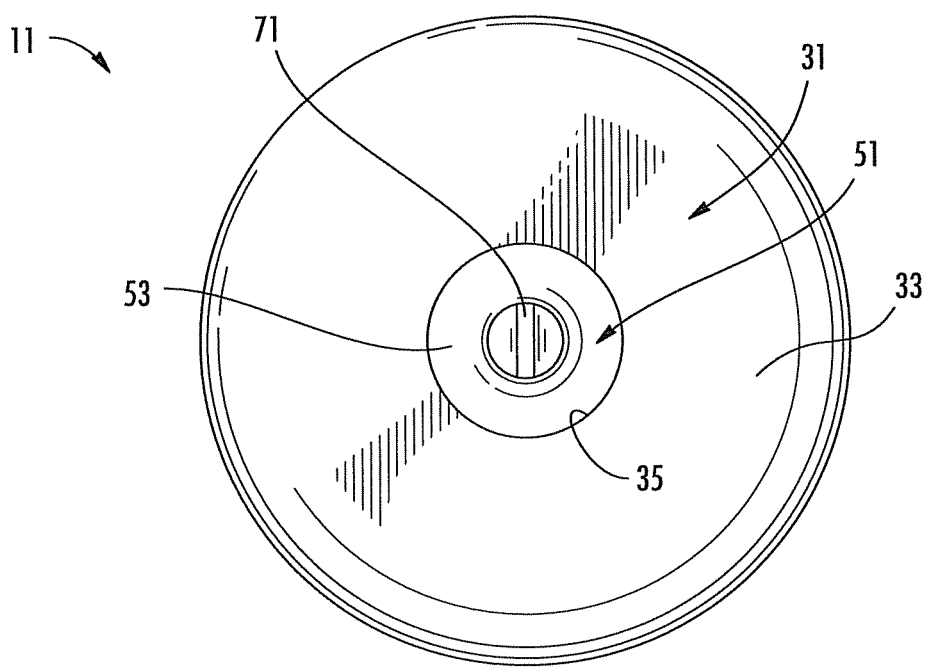

Referring to FIGS. 9A and 9B, a second embodiment of a tamper-proof cap assembly 11 of the presently disclosed subject matter can comprise an outer cap 31 and an inner cap 51. Both outer cap 31 and an inner cap 51 can comprise substantially cylindrical structures (see FIG. 9B providing a top view of tamper-proof cap assembly 11). As illustrated in the cross sectional view of FIG. 9A, inner cap 51 can captively reside in outer cap 31, whereby outer cap 31 can rotate freely around inner cap 51. Inner cap 51 can threadingly receive a threaded end of an access valve, such as a refrigeration access valve (see access valve 200 in FIG. 8). Once fitted to an access valve, tamper-proof cap assembly 11 can resist removal by an unauthorized user since rotation of outer cap 31 will not cause inner cap 51 to become unthreaded from the access valve.

Figure 10A:
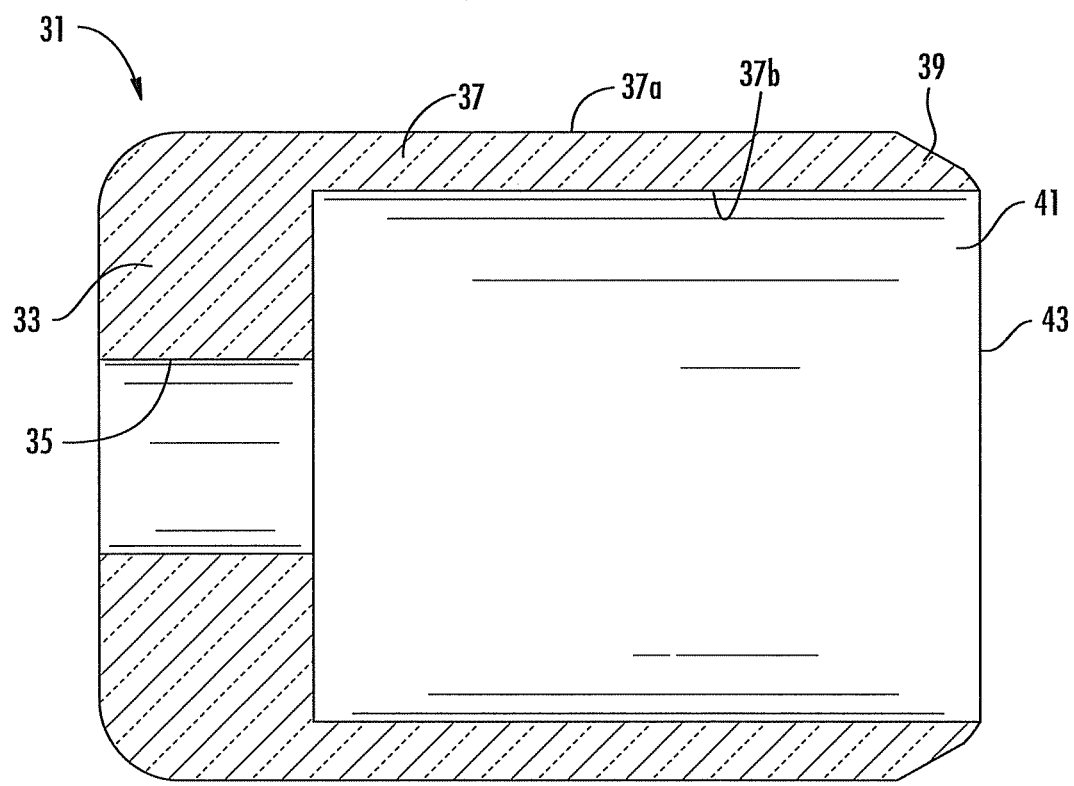
FIGS. 10A and 10B are cross sectional and top views, respectively, of a second embodiment of an outer cap of a tamper-proof cap assembly according to the subject matter herein.
Figure 10B:
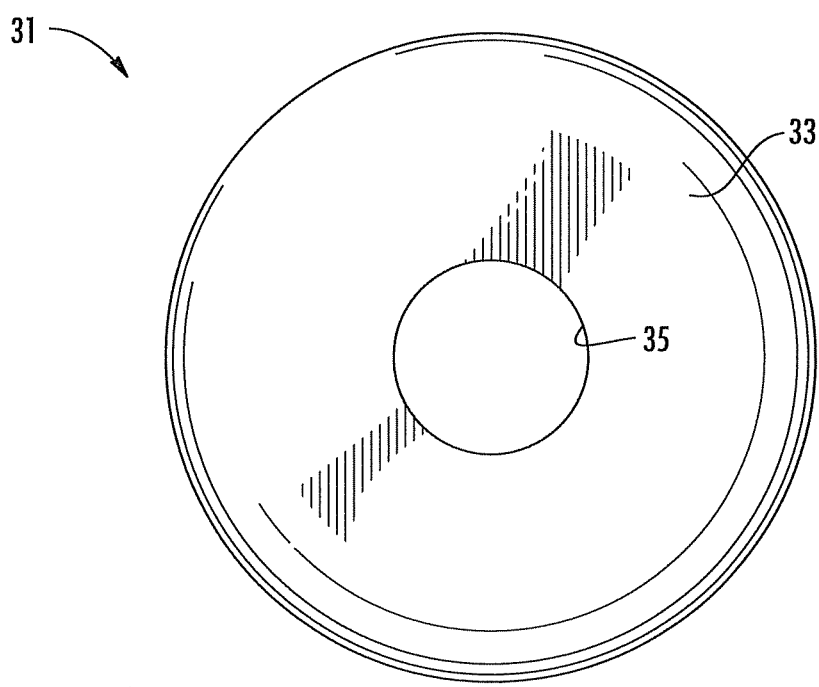

Referring to FIGS. 9A, 10A and 10B, a second embodiment of a tamper-proof cap assembly 11 of the presently disclosed subject matter can comprise an outer cap 31 having an upper endwall 33 with an opening 35 therein, a sidewall 37 extending down from the upper endwall 33 to an open lower end 43, the open lower end 43 leading into an internal cylindrical cavity 41 defined by the sidewall 37 having a cylindrical interior surface 37b. In some aspects, outer cap 31 can comprise a cylindrical structure with sidewalls 37 forming a cylindrical wall extending from a substantially flat or planar upper endwall 33, as illustrated in FIG. 10B. In some aspects, the exterior surface 37a of sidewall 37 of outer cap 31 can form a substantially cylindrical structure. In some aspects, the exterior surface 37a of sidewall 37 of outer cap 31 can form a hexagon, octagon or any other polygonal structure. Conversely, the interior surface 37b of sidewall 37 of outer cap 31 can be cylindrical, thereby forming internal cylindrical cavity 41. In some embodiments, the terminal end 39 of sidewall 37 of outer cap 31 can be tapered such that the thickness of the sidewall 37 at terminal end 39 is less than the thickness at other points along sidewall 37.

Outer cap 31 can comprise a substantially cylindrical structure having for example an outside diameter of about 0.5 inches to about 1.0 inches. In some aspects, the outside diameter of outer cap 31 is about 0.5 inches, 0.55 inches, 0.6 inches, 0.65 inches, 0.7 inches, 0.75 inches, 0.8 inches, 0.85 inches, 0.9 inches, 0.95 inches or 1.0 inches. In some aspects, the outside diameter of outer cap 31 is about 0.625 inches.

Outer cap 31 can comprise a substantially cylindrical structure having an overall height (from the top of upper endwall 33 to the bottom of open lower end 43) for example of about 0.5 inches to about 1.0 inches. In some aspects, the height of outer cap 31 is about 0.5 inches, 0.55 inches, 0.6 inches, 0.65 inches, 0.7 inches, 0.75 inches, 0.8 inches, 0.85 inches, 0.9 inches, 0.95 inches or 1.0 inches. In some aspects, the height of outer cap 31 is about 0.665 inches.

The thickness of sidewall 37 of outer cap 31 can range for example from about 0.01 inches to about 0.1 inches. In some aspects, the thickness of sidewall 37 is about 0.01 inches, 0.015 inches, 0.02 inches, 0.025 inches, 0.03 inches, 0.035 inches, 0.04 inches, 0.045 inches, 0.05 inches, 0.055 inches, 0.06 inches, 0.065 inches, 0.07 inches, 0.075 inches, 0.08 inches, 0.085 inches, 0.09 inches, 0.095 inches or 0.1 inches. In some aspects, the thickness of sidewall 37 is about 0.055 inches.

Upper endwall 33 of outer cap 31 can have a thickness of for example about 0.05 inches to about 0.5 inches. In some aspects, the thickness of upper endwall 33 of outer cap 31 can range from about 0.05 inches, 0.1 inches, 0.15 inches, 0.2 inches, 0.25 inches, 0.3 inches, 0.35 inches, 0.4 inches, 0.45 inches or 0.5 inches. In some aspects, the thickness of upper endwall 33 of outer cap 31 is about 0.05 inches.

Sidewall 37 of outer cap 31 can extend about 0.4 inches to about 0.9 inches from upper endwall 33. In some aspects, sidewall 37 of outer cap 31 can extend about 0.4 inches, 0.45 inches, 0.5 inches, 0.55 inches, 0.6 inches, 0.65 inches, 0.7 inches, 0.75 inches, 0.8 inches, 0.85 inches, or 0.9 inches from upper endwall 33. In some aspects, sidewall 37 of outer cap 31 can extend about 0.615 inches from upper endwall 33.

Internal cavity 41 of outer cap 31 can be substantially cylindrical and have a diameter of about 0.3 inches to about 0.8 inches. In some aspects, the diameter of internal cavity 41 is about 0.3 inches, 0.35 inches, 0.4 inches, 0.45 inches, 0.5 inches, 0.55 inches, 0.6 inches, 0.65 inches, 0.7 inches, 0.75 inches or 0.8 inches. In some aspects, the interior diameter of internal cavity 41 is about 0.515 inches.

Continuing with FIGS. 9A, 10A and 10B, upper endwall 33 of outer cap 31 can comprise a substantially flat or planar surface from which sidewall 37 extends. In some aspects, opening 35 in upper endwall 33 of outer cap 31 can comprise a circular opening as illustrated in FIGS. 10A and 10B. In some aspects, opening 35 in upper endwall 33 of outer cap 31 can extend through upper endwall 33 such that interior cavity 41 is accessible through opening 35 of upper endwall 33. In some aspects, the diameter of opening 35 is less than the diameter of internal cavity 41. In some aspects, the diameter of opening 35 can range for example from about 0.2 inches to about 0.5 inches. In some aspects, the diameter of opening 35 can range from about 0.2 inches, 0.25 inches, 0.3 inches, 0.35 inches, 0.4 inches, 0.45 inches or 0.5 inches. In some aspects, the diameter of opening 35 is about 0.2 inches.

Figure 11A:
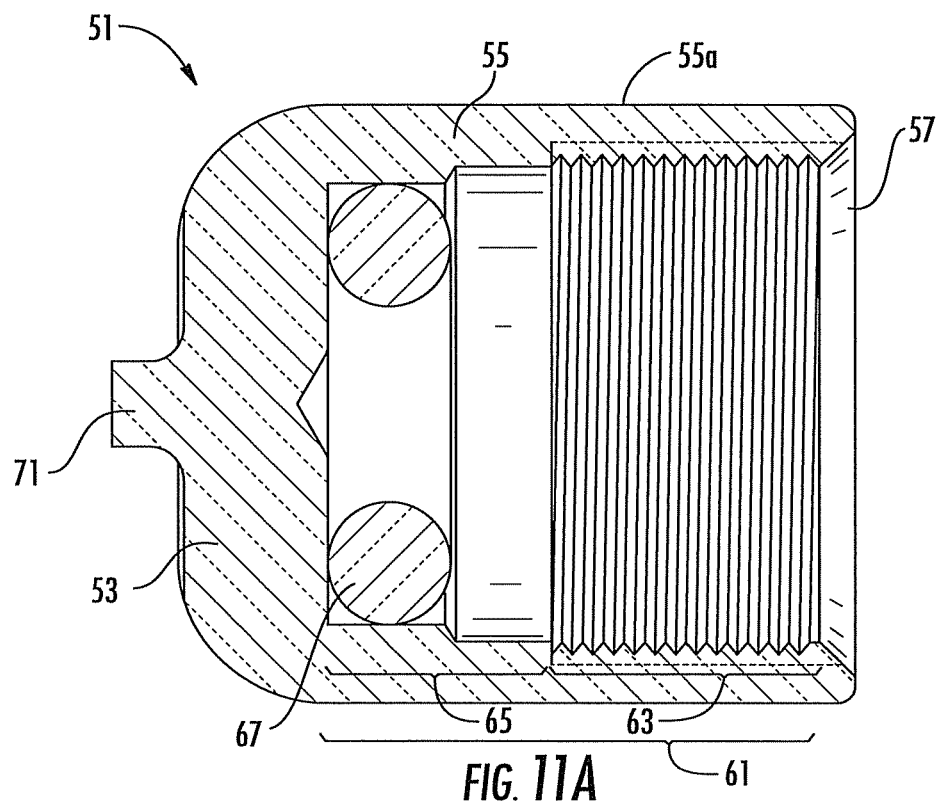
FIGS. 11A and 11B are cross sectional and top views, respectively, of a second embodiment of an inner cap of a tamper-proof cap assembly according to the subject matter herein.
Figure 11B:
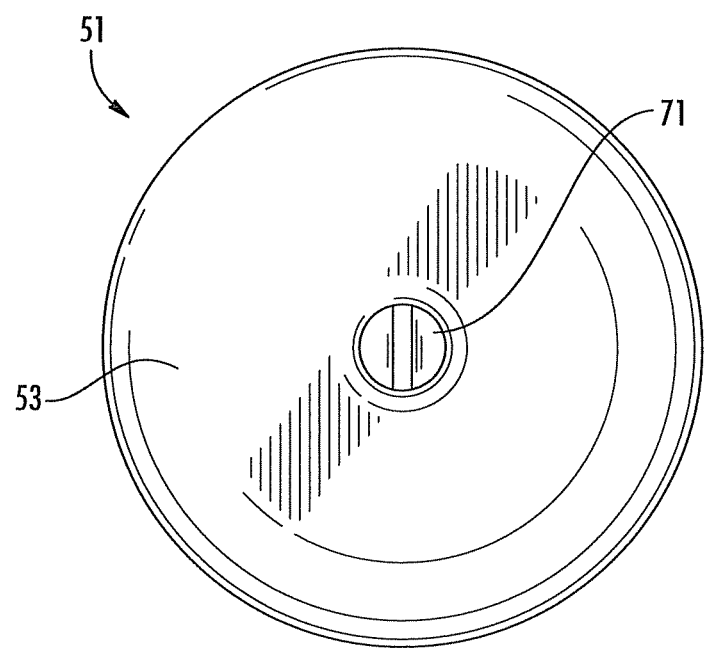

Referring to FIGS. 9A, 11A and 11B, a tamper-proof cap assembly 11 can further comprise a cylindrical inner cap 51 having an upper endwall 53, a cylindrical sidewall 55 extending down from the upper endwall 53 to an open lower end 57, the open lower end 57 leading to an internal cavity 61 defined by sidewall 55, wherein internal cavity 61 can comprise a threaded portion 63 capable of threadingly receiving a threaded cylindrical end of an access valve 200 (e.g. a refrigeration access valve, see FIG. 8). In some aspects, inner cap 51 can further comprise tab 71, wherein tab 71 is a tabular structure extending perpendicular from the center of endwall 53 of inner cap 51 (see top view of inner cap 51 in FIG. 11B). In some aspects, internal cavity 61 of inner cap 51 can further comprise a headspace portion 65 extending above threaded portion 63. In some aspects, headspace 65 can optionally comprise O-ring 67.

In some aspects, the exterior surface 55a of sidewall 55 of inner cap 51 can form a substantially cylindrical structure. In some aspects, inner cap 51 can comprise a substantially cylindrical structure having a diameter and height less than the diameter and depth of interior cavity 41 of outer cap 31. In some aspects, the size (height and diameter) of inner cap 51 is substantially similar to, but yet slightly smaller than the size (diameter and depth) of interior cavity 41 of outer cap 31. The difference in size of inner cap 51 and interior cavity 41 of outer cap 31 allows inner cap 51 to captively reside in interior cavity 41. Further, the difference in size of inner cap 51 and interior cavity 41 of outer cap 31 can provide for a radial clearance between exterior surface 55a of sidewall 55 of inner cap 51 and interior surface 37b of sidewall 37 of outer cap 31, thereby allowing inner cap 51 to rotate freely within interior cavity 41 and independent of outer cap 31. The radial clearance between exterior surface 55a of sidewall 55 of inner cap 51 and interior surface 37b of sidewall 37 of outer cap 31 can for example range from about 0.005 to about 0.015 inches. In some embodiments, the radial clearance between exterior surface 55a of sidewall 55 of inner cap 51 and interior surface 37b of sidewall 37 of outer cap 31 can be about 0.005 inches, about 0.010 inches, or about 0.015 inches.

Inner cap 51 can comprise a substantially cylindrical structure having an outside diameter for example of about 0.3 inches to about 0.8 inches. In some aspects, the outside diameter of inner cap 51 can be about 0.3 inches, 0.35 inches, 0.4 inches, 0.45 inches, 0.5 inches, 0.55 inches, 0.6 inches, 0.65 inches, 0.7 inches, 0.75 inches or 0.8 inches. In some aspects, the outside diameter of outer cap 31 is about 0.4985 inches to about 0.5015 inches.

Inner cap 51 can comprise a substantially cylindrical structure having an overall height (from the top of upper endwall 53 to the bottom of open lower end 57) for example of about 0.3 inches to about 0.9 inches. In some aspects, the height of inner cap 51 is about 0.3 inches, 0.35 inches, 0.4 inches, 0.45 inches, 0.5 inches, 0.55 inches, 0.6 inches, 0.65 inches, 0.7 inches, 0.75 inches, 0.8 inches, 0.85 inches or 0.9 inches. In some aspects, the height of inner cap 51 is about 0.575 inches.

The thickness of sidewall 55 of inner cap 51 can range for example from about 0.01 inches to about 0.1 inches. In some aspects, the thickness of sidewall 55 is about 0.01 inches, 0.015 inches, 0.02 inches, 0.025 inches, 0.03 inches, 0.035 inches, 0.04 inches, 0.045 inches, 0.05 inches, 0.055 inches, 0.06 inches, 0.065 inches, 0.07 inches, 0.075 inches, 0.08 inches, 0.085 inches, 0.09 inches, 0.095 inches or 0.1 inches. In some aspects, the thickness of sidewall 55 of inner cap 51 is variable depending on the structure of internal cavity 61. In some aspects, the thickness of sidewall 55 is about 0.0485 inches to about 0.1265 inches.

Upper endwall 53 of inner cap 51 can have a thickness for example of about 0.05 inches to about 0.25 inches. In some aspects, the thickness of upper endwall 53 of inner cap 51 can range from about 0.05 inches, 0.1 inches, 0.15 inches, 0.2 inches, or 0.25 inches. In some aspects, the thickness of upper endwall 53 of inner cap 51 is about 0.14 inches.

Tab 71, a tabular structure, or slotted head, extending perpendicular from upper endwall 53, can for example extend about 0.1 inches to about 0.5 inches from upper endwall 53. In some aspects, tab 71 extends from the center of upper endwall 53 of inner cap 51. In some aspects, tab 71 is accessible through opening 35 of upper endwall 33 of outer cap 31 when outer cap 31 and inner cap 51 are assembled.

Sidewall 55 of inner cap 51 can extend for example about 0.3 inches to about 0.8 inches from upper endwall 53. In some aspects, sidewall 55 of inner cap 51 can extend about 0.3 inches, 0.35 inches, 0.4 inches, 0.45 inches, 0.5 inches, 0.55 inches, 0.6 inches, 0.65 inches, 0.7 inches, 0.75 inches, or 0.8 inches from upper endwall 53. In some aspects, sidewall 55 of inner cap 51 can extend about 0.435 inches from upper endwall 53.

Internal cavity 61 of inner cap 51 can be substantially cylindrical and have a diameter for example of about 0.25 inches to about 0.7 inches. In some aspects, the diameter of internal cavity 61 is about 0.25 inches, 0.3 inches, 0.35 inches, 0.4 inches, 0.45 inches, 0.5 inches, 0.55 inches, 0.6 inches, 0.65 inches, or 0.7 inches. In some aspects, the diameter of internal cavity 61 is about 0.45 inches. In some aspects, the diameter of internal cavity 61 is variable depending on the structure of internal cavity 61. In some aspects, the diameter of threaded portion 63 is sufficient to threadingly receive the threaded end of access valve 200, such as a refrigeration access valve (see FIG. 8). In some aspects, the diameter of threaded portion 63 and headspace portion 65 of internal cavity 61 are substantially similar. In some aspects, the diameter of threaded portion 63 is greater than that of headspace portion 65, wherein the diameter of headspace portion 65 is slightly tapered as compared to threaded portion 63, and/or decreases in diameter in a step-wise fashion (see FIG. 11A). In some aspects, the diameter of headspace portion 65 is variable and designed to accommodate O-ring 67.

Threaded portion 63 of internal cavity 61 can extend for example about 0.15 inches to about 0.35 inches into internal cavity 61, as measured from open lower end 57. In some aspects, threaded portion 63 of internal cavity 61 extends about 0.15 inches, 0.2 inches, 0.25 inches, 0.3 inches, or 0.35 inches into internal cavity 61, as measured from open lower end 57. In some aspects, threaded portion 63 of internal cavity 61 extends about 0.25 inches into internal cavity 61, as measured from open lower end 57. In some aspects, threaded portion 63 comprises sufficient threading to adequately receive the threaded end of access valve 200.

Headspace portion 65 of internal cavity 61 can comprise that portion of internal cavity 61 that is not threaded and that extends above threaded portion 63. In some aspects, headspace portion 65 can for example extend about 0.1 inches to about 0.3 inches above threaded portion 63. In some aspects, headspace portion 65 of internal cavity 61 extends about 0.1 inches, 0.15 inches, 0.2 inches, 0.25 inches or 0.3 inches above threaded portion 63. In some aspects, headspace portion 65 of internal cavity 61 extends about 0.185 inches above threaded portion 63. In some aspects, headspace portion 65 extends a sufficient distance above threaded portion 63 to adequately receive the terminal end of access valve 200. In some aspects, headspace portion 65 is capable of retaining O-ring 67 to which the terminal end of access valve 200 can abut when threadingly received into internal cavity 61, thereby creating an air-tight seal.

Figure 12A:
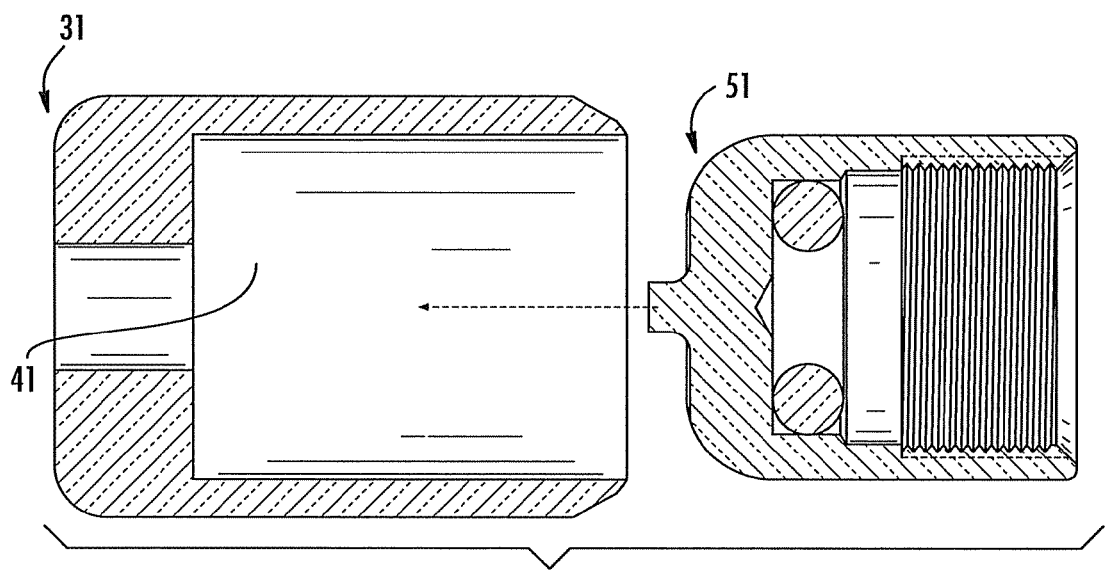
FIGS. 12A, 12B and 12C are cross sectional views of a second embodiment of a tamper-proof cap assembly as the components of the assembly are assembled according to the subject matter herein.
Figure 12B:
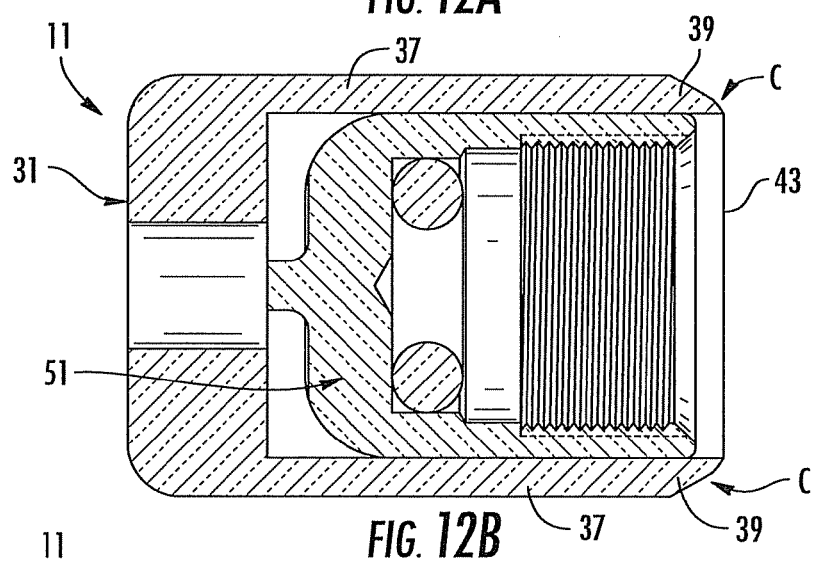
Figure 12C:
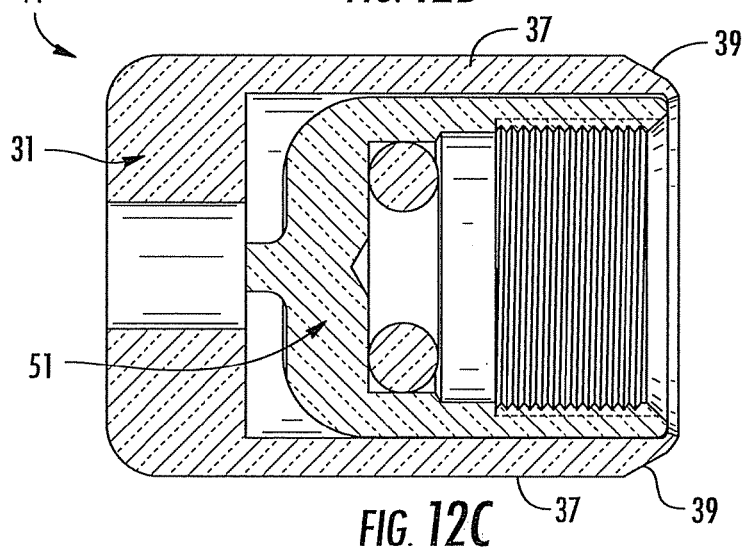

Referring to FIGS. 12A, 12B and 12C, outer cap 31 and inner cap 51 can be separate components that can be assembled into tamper-proof cap assembly 11. FIG. 12A illustrates a cross sectional view of outer cap 31 and an inner cap 51 prior to their assembly, wherein inner cap 51 is receivable in internal cavity 41 of outer cap 51. FIG. 12B is a cross sectional view of tamper-proof cap assembly 11 wherein inner cap 51 has been inserted into internal cavity 41 of outer cap 31. Once inserted, terminal ends 39 of sidewalls 37 of outer cap 31 can be crimped C so as to enclose open lower end 43, thereby captively retaining inner cap 51 within internal cavity 41 of outer cap 31. FIG. 12C is a cross sectional view of tamper-proof cap assembly 11 wherein terminal ends 39 of sidewalls 37 have been crimped inward sufficient to captively contain inner cap 51.

Figure 13A:
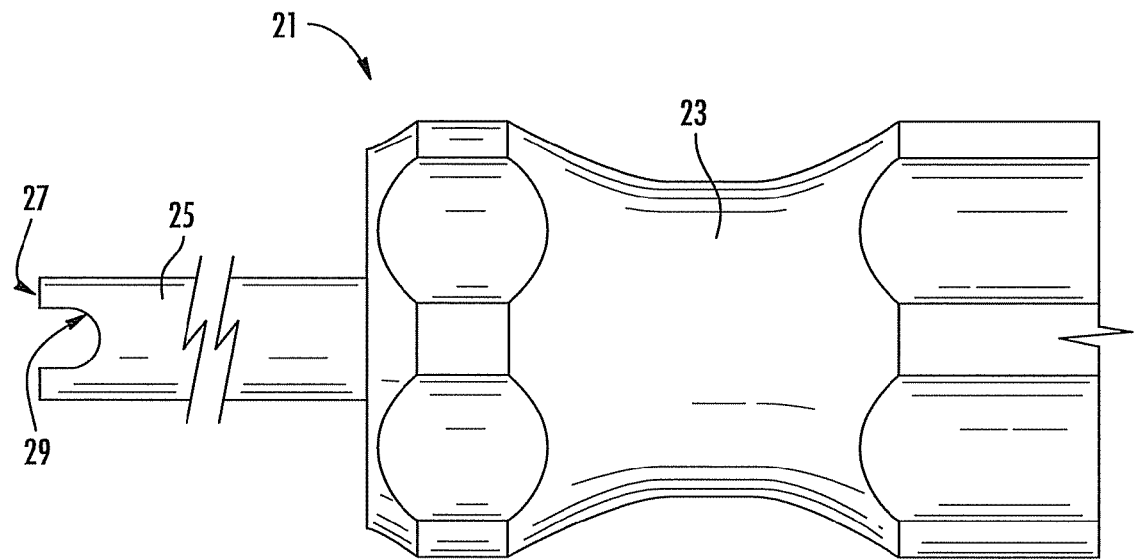
FIGS. 13A and 13B are side and top views, respectively, of a second embodiment of a tool of a tamper-proof cap system according to the subject matter herein.
Figure 13B:
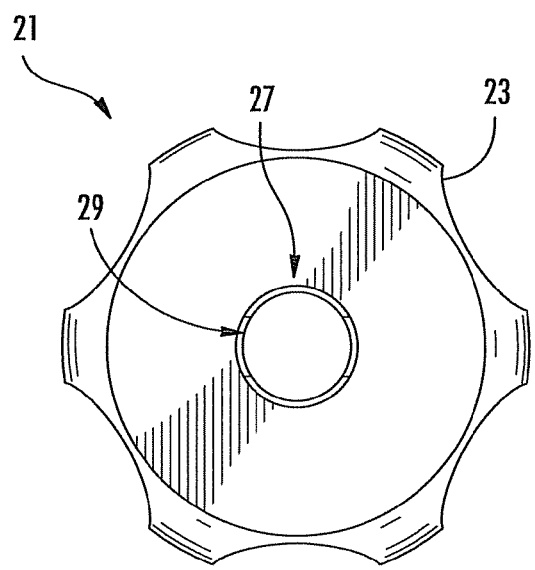

Referring now to FIGS. 13A and 13B, tool 21 can be a component of the presently disclosed tamper-proof cap system 101. Tool 21 is designed to allow an authorized user to manipulate or remove a tamper-proof cap assembly 11 installed on an access valve, such as a refrigeration access valve (see 200 in FIG. 8), and thereby access the access valve. Without tool 21, an unauthorized user is prevented from removing a tamper-proof cap assembly 11 installed on an access valve. As illustrated in FIGS. 13A and 13B, side and bottom views of tool 21, respectively, tool 21 can be a screwdriver-like structure comprising a handle 23 having a cylindrical rod 25 that extends therefrom, wherein cylindrical rod 25 comprises a terminal end 27 that is slotted 29. In some aspects, tool 21, comprising handle 23 and cylindrical rod 25, is a single unity piece.

In some aspects, handle 23 can comprise a generally cylindrical structure designed to allow a user to grip tool 21 and apply a rotational force thereto. In some aspects, handle 23 can comprise a textured or gripped surface, e.g. a screwdriver handle, to improve the gripping ability of tool 21, to thereby assist a user in applying a rotational force thereto. In some aspects, handle 23 can form a hexagon, octagon or any other polygonal structure, such that tool 21 can be manipulated with a wrench, socket or other tool suitable for mechanically engaging a bolt-like structure.

In some aspects, tool 21 can be of a size similar to a screwdriver. For example, handle 23 can have a diameter for example of about 0.5 inches to about 1.5 inches, and a length of about 0.5 inches to about 10 inches. Cylindrical rod 25 of tool 21 can be about 0.5 inches in length to about 12 inches in length, and have a diameter of about 0.2 inches to about 0.6 inches. The overall length of tool 21 can be about 1 inch to about 20 inches or more.

Cylindrical rod 25 of tool 21 is a cylindrical structure extending from handle 23 similar to the shaft of a screwdriver. Cylindrical rod 25 designed such that it can slidingly engage opening 35 of upper endwall 35 of outer cap 31 and engage tab 71 of inner cap 51 which is in communication with and accessible through opening 35, as illustrated in FIGS. 14B and 14C and discussed further hereinbelow. In some aspects, cylindrical rod 25 of tool 21 has a diameter less than the diameter of opening 35 of outer cap 31. In some aspects, cylindrical rod 25 of tool 21 has a diameter substantially similar to but slightly less than the diameter of opening 35 to thereby allow cylindrical rod 25 to slidingly and securely engage opening 35. In some aspects, the diameter of cylindrical rod 25 can for example range from about 0.2 inches to about 0.6 inches. In some aspects, the diameter of cylindrical rod 25 can range from about 0.2 inches, 0.25 inches, 0.3 inches, 0.35 inches, 0.4 inches, 0.45 inches, 0.5 inches, 0.55 inches, or 0.6 inches. In some aspects, cylindrical rod 25 of tool 21 can be a solid rod-like structure. In some aspects, cylindrical rod 25 of tool 21 can be a hollow tube-like structure.

In some aspects, cylindrical rod 25 of tool 21 has a length, i.e. extends from handle 23, that is substantially similar to the thickness of upper endwall 33 of outer cap 31, such that handle 23 abuts against upper endwall 33 of outer cap 31 when cylindrical rod 25 is engaged to tab 71 by way of opening 35 of upper endwall 33. In some aspects, cylindrical rod 25 of tool 21 has a length, i.e. extends from handle 23, that is at least equal to or greater than the thickness of upper endwall 33 of outer cap 31 such that terminal end 27 and slot 29 of cylindrical rod 25 can engage tab 71 through opening 35 of upper endwall 33. In some aspects, cylindrical rod 25 of tool 21 has a length, i.e. extends from handle 23, that is substantially greater than the thickness of upper endwall 33 of outer cap 31. See FIGS. 14B and 14C, both of which are discussed further hereinbelow.

Continuing with FIGS. 13A and 13B, cylindrical rod 25 of tool 21 can comprise a slot 29 at terminal end 27. Slot 29 can comprise a rounded, squared or notched cut-away in the terminal end of cylindrical rod 25. Slot 29 can be of sufficient depth and width to slidingly engage tab 71 of inner cap 51 such that tool 21 and inner cap 51 can become mechanically engaged.

Figure 14A:
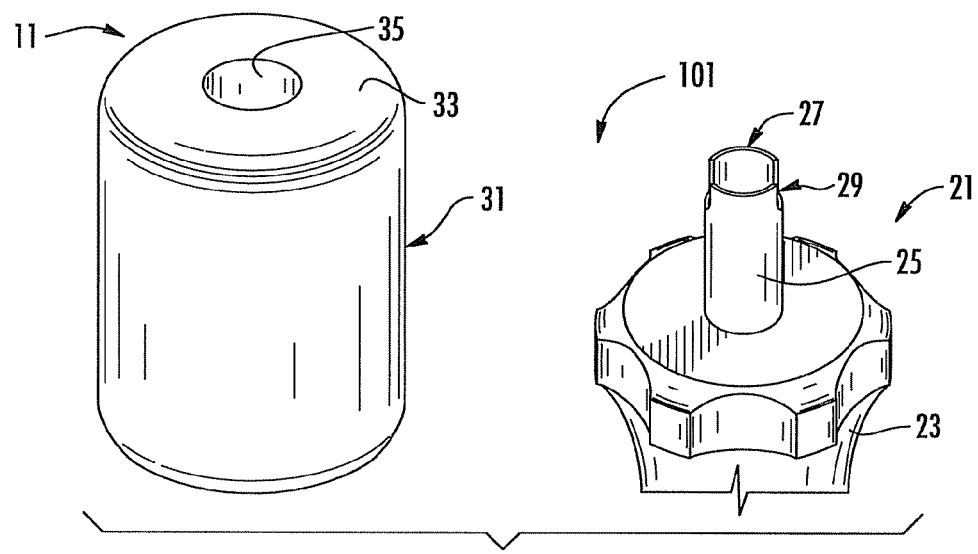
FIGS. 14A, 14B and 14C are views of a second embodiment of a tamper-proof cap system according to the subject matter herein.
Figure 14B:
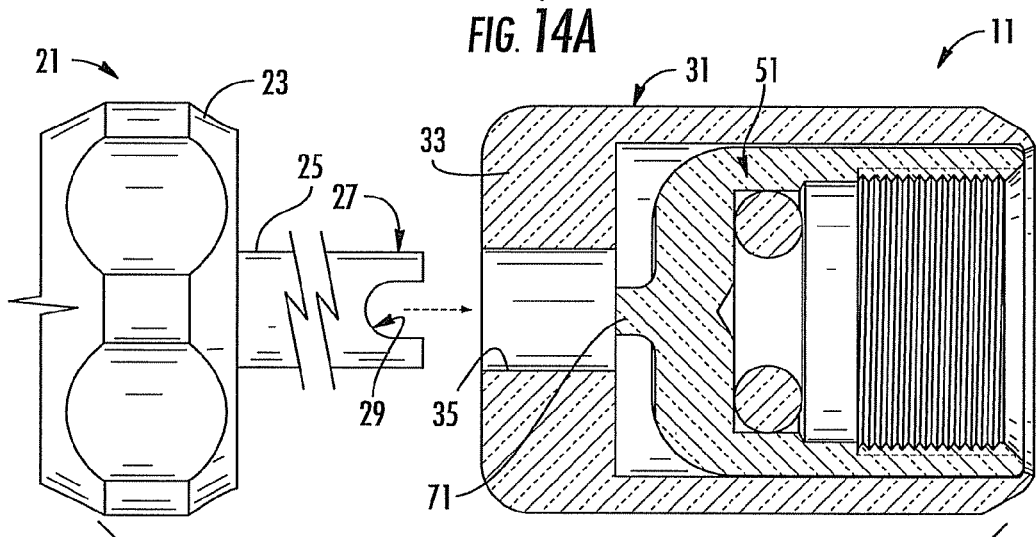
Figure 14C:
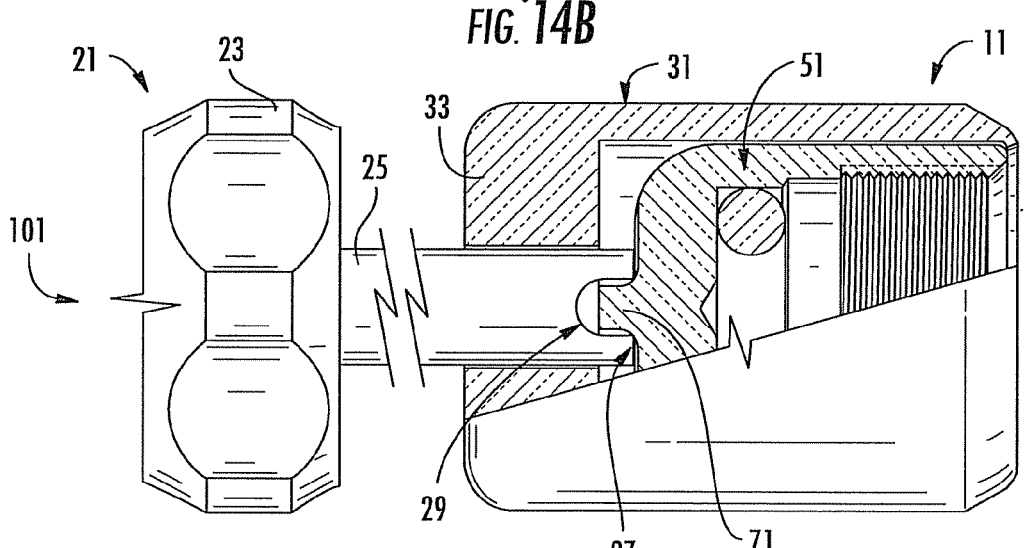

FIGS. 14A, 14B and 14C illustrate the use of tool 21 with tamper-proof cap assembly 11. FIG. 14A, a perspective view of a tamper-proof cap system 101, shows the separate components comprising tamper-proof cap assembly 11 and tool 21. A user can engage tool 21 with tamper-proof cap assembly 11 by gripping handle 23 of tool 21 and sliding cylindrical rod 25 of tool 21 into opening 35 of upper endwall 33 of outer cap 31, as illustrated in FIGS. 14B and 14C. Engaging slot 29 of terminal end 27 of tool 21 to tab 71, which is accessible through opening 35 of upper endwall 33 of outer cap 31, allows for tool 21 to become mechanically engaged to inner cap 51.

Upon application of tool 21 to tamper-proof cap assembly 11, tool 21 and inner cap 51 become mechanically engaged by virtue of slot 29 of terminal end 27 of tool 21 engaging tab 71. See FIG. 14C, which illustrates tamper-proof cap system 101 after engagement of tool 21 with tamper-proof cap assembly 11 in a partial cut-away view. Once mechanically engaged, the application of a rotational force to tool 21 by a user translates the rotational force to inner cap 51 thereby allowing inner cap 51 to be manipulated, whereby inner cap 51 can be screwed onto or off of the threaded end of an access valve.

Notably, without the use of tool 21 a user cannot remove tamper-proof cap assembly 11 from an access valve. Because inner cap 51 captively resides within internal cavity 41 of outer cap 31 with a radial clearance there between, rotation of outer cap 31 fails to translate a rotational force to inner cap 51. Thus, manipulating outer cap 31 by an unauthorized user, without the use of tool 21, fails to unscrew inner cap 51 from an access valve. As such, tamper-proof cap assembly 11 prevents unauthorized access to an access valve, such as a refrigeration access valve (see 200 in FIG. 8), while allowing an authorized user to remove tamper-proof cap assembly 11 by using tool 21. Tamper-proof cap assembly 11 thereby provides a tamper-proof, tamper-resistant, secure or impenetrable barrier to an access valve.

In some aspects, tamper-proof cap system 101, including tamper-proof cap assembly 11 and tool 21, can be made of any suitable metal alloy, as would be appreciated by one of ordinary skill in the art. In some embodiments, a suitable metal alloy can include brass, nickel plated brass, chrome plated brass, aluminum or steel. In some aspects, tamper-proof cap system 101, including tamper-proof cap assembly 11 and tool 21, can be made of any suitable material as would be appreciated by one of ordinary skill in the art. In some embodiments, a suitable material can include a durable plastic or a durable polymer. In some aspects, the various components of tamper-proof cap system 101 can be made of different materials or alloys. In some aspects, the various components of tamper-proof cap system 101 are constructed of materials that impart desirable characteristics such as strength, durability, corrosion resistance, or the ability to withstand environmental conditions such as high and low temperatures, humidity and moisture. In some aspects, the various components of tamper-proof cap system 101 are constructed of materials that impart a desirable appearance or look. In some embodiments, tool 21 can comprise a handle 23 comprising a plastic, rubber or polymer material, and a cylindrical rod 25 made of a suitable metal alloy.

In some aspects, tamper-proof cap system 100 and/or 101 can be packed and sold as a kit. Such a kit can include tamper-proof cap assembly 10 and/or 11 and tool 20 and/or 21. In some embodiments, a kit can include multiple tamper-proof cap assemblies 10 and/or 11 and one or more tools 20 and/or 21. Kits can also include instructions for use of tamper-proof cap system 100 and/or 101.

As can be appreciated, tamper-proof cap system 100 and/or 101 can be suitable for use on any number of existing access valves. In some aspects, tamper-proof cap system 100 and/or 101, including tamper-proof cap assembly 10 and/or 11, and tool 20 and/or 21, can be provided in multiple sizes so as to accommodate existing access valves in use. Commonly used access valves, or refrigeration access valves, can be classified by their material, diameter, length, and shape. By way of example and not limitation, a refrigeration access valve suitable for use with tamper-proof cap system 100 and/or 101 can include: valves ranging in length from about 0.5 inches to about 3 inches; valves having a pipe thread connection such as ⅛-27 NPT, 1-4-18 NPT, 1/16-27 NPT; valves comprising hex stock (various sizes) or round stock.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A tamper-resistant cap assembly for use with an access valve, the assembly comprising:

an outer cap having an upper endwall with an opening therein, a sidewall extending down from the upper endwall to an open lower end, the open lower end leading into an internal cylindrical cavity defined by the sidewall having a cylindrical interior surface;

a cylindrical inner cap having an upper endwall, a cylindrical sidewall extending down from the upper endwall to an open lower end, the open lower end leading to an internal threaded cylindrical cavity defined by the cylindrical sidewall having a cylindrical interior surface, wherein the internal threaded cavity can threadingly receive a threaded cylindrical end of an access valve, wherein the inner cap captively resides within the internal cavity of the outer cap with a radial clearance between the cylindrical sidewall of the inner cap and the cylindrical sidewall of the internal cavity of the outer cap sufficient to enable free rotation of the inner cap within the internal cavity of the outer cap, wherein the upper endwall of the inner cap further comprises a tabular element extending from the upper endwall of the inner cap, wherein the tabular element is accessible through the opening in the upper endwall of the outer cap.

2. The tamper-resistant cap assembly of claim 1, wherein the outer cap rotates independently of the inner cap when the cap assembly is threadingly engaged to an access valve, thereby precluding removal of the cap assembly from the access valve by rotating the outer cap.

3. The tamper-resistant cap assembly of claim 1, wherein the outer cap comprises a cylindrical structure with a circular upper endwall and a cylindrical sidewall extending down from the upper endwall.

4. The tamper-resistant cap assembly of claim 1, wherein the terminal end of the sidewall of the outer cap leading to the open lower end of the outer cap is crimped inward sufficient to captively contain the inner cap within the internal cavity of the outer cap.

5. The tamper-resistant cap assembly of claim 1, wherein the threaded internal cavity of the inner cap further comprises a headspace adjacent to and extending above the threads of the threaded cavity for threadingly receiving a threaded cylindrical end of an access valve.

6. The tamper-resistant cap assembly of claim 5, wherein the headspace further comprises an O-ring seated within the headspace and positioned to abut against the threaded cylindrical end of an access valve threadingly received in the internal threaded cavity of the inner cap.

7. The tamper-resistant cap assembly of claim 1, wherein the upper endwall of the inner cap is in communication with and accessible through the opening of the upper endwall of the outer cap.

8. The tamper-resistant cap assembly of claim 1, wherein the outer cap and inner cap comprise a metal alloy.

9. A tamper-resistant cap system for use with an access valve, the system comprising:
an outer cap having an upper endwall with an opening therein, a sidewall extending down from the upper endwall to an open lower end, the open lower end leading into an internal cylindrical cavity defined by the sidewall having a cylindrical interior surface;
a cylindrical inner cap having an upper endwall, a cylindrical sidewall extending down from the upper endwall to an open lower end, the open lower end leading to an internal threaded cylindrical cavity defined by the cylindrical sidewall having a cylindrical interior surface, wherein the internal threaded cavity can threadingly receive a threaded cylindrical end of an access valve, wherein the inner cap captively resides within the internal cavity of the outer cap with a radial clearance between the cylindrical sidewall of the inner cap and the cylindrical sidewall of the internal cavity of the outer cap sufficient to enable free rotation of the inner cap within the internal cavity of the outer cap, wherein the upper endwall of the inner cap further comprises a tabular element extending from the upper endwall of the inner cap, wherein the tabular element is accessible through the opening in the upper endwall of the outer cap; and
a tool for manipulating the inner cap, wherein the tool is configured for manipulating the inner cap by engaging the inner cap through the opening in the upper endwall of the outer cap.

10. The tamper-resistant cap system of claim 9, wherein the outer cap and inner cap together comprise a tamper-resistant cap assembly.

11. The tamper-resistant cap system of claim 10, wherein the outer cap rotates independently of the inner cap when the cap assembly is threadingly engaged to an access valve, thereby precluding removal of the cap assembly from the access valve by rotating the outer cap.

12. The tamper-resistant cap system of claim 9, wherein the outer cap is a cylindrical structure comprising a circular upper endwall and a cylindrical sidewall extending down from the upper endwall.

13. The tamper-resistant cap system of claim 9, wherein the terminal end of the sidewall of the outer cap leading to the open lower end of the outer cap is crimped inward sufficient to captively contain the inner cap within the internal cavity of the outer cap.

14. The tamper-resistant cap system of claim 9, wherein the threaded internal cavity of the inner cap further comprises a headspace adjacent to and extending above the threads of the threaded cavity for threadingly receiving a threaded cylindrical end of an access valve.

15. The tamper-resistant cap system of claim 14, wherein the headspace further comprises an O-ring seated within the headspace and positioned to abut against the threaded cylindrical end of an access valve threadingly received in the internal threaded cavity of the inner cap.

16. The tamper-resistant cap system of claim 9, wherein the upper endwall of the inner cap is in communication with and accessible through the opening of the upper endwall of the outer cap.

17. The tamper-resistant cap assembly of claim 9, wherein the outer cap, inner cap and tool comprise one or more metal alloys.

18. The tamper-resistant cap system of claim 9, wherein the tool comprises a handle and a cylindrical rod extending from the handle, wherein the cylindrical rod terminates at an end, wherein the terminal end of the cylindrical rod is slotted.

19. The tamper-resistant cap system of claim 18, wherein the cylindrical rod of the tool is slidingly engageable with the opening of the upper endwall of the outer cap and the inner cap.

20. The tamper-resistant cap system of claim 19, wherein the slotted terminal end of the cylindrical rod of the tool is matingly engageable with the tabular element of the inner cap, whereby the tool and inner cap are mechanically engageable such that application of a rotational force to the tool translates the rotational force to the inner cap thereby allowing the inner cap to be manipulated to screw the inner cap onto or off of the threaded end of an access valve.

21. A tamper-resistant cap assembly for use with an access valve, the assembly comprising:
an outer cap having an upper endwall with an opening therein, a sidewall extending down from the upper endwall to an open lower end, the open lower end leading into an internal cylindrical cavity defined by the sidewall having a cylindrical interior surface;
a cylindrical inner cap having an upper endwall, a cylindrical sidewall extending down from the upper endwall to an open lower end, the open lower end leading to an internal threaded cylindrical cavity defined by the cylindrical sidewall having a cylindrical interior surface, wherein the internal threaded cavity can threadingly receive a threaded cylindrical end of an access valve, wherein the inner cap captively resides within the internal cavity of the outer cap with a radial clearance between the cylindrical sidewall of the inner cap and the cylindrical sidewall of the internal cavity of the outer cap sufficient to enable free rotation of the inner cap within the internal cavity of the outer cap, wherein the upper endwall of the inner cap further comprises a keyhole, wherein the keyhole is radially off-set from the center of the upper endwall of the inner cap, wherein the keyhole is accessible through the opening in the upper endwall of the outer cap.

22. The tamper-resistant cap assembly of claim 21, wherein the keyhole comprises a recessed cylindrical cavity in the upper endwall of the inner cap.

23. A tamper-resistant cap system for use with an access valve, the system comprising:

an outer cap having an upper endwall with an opening therein, a sidewall extending down from the upper endwall to an open lower end, the open lower end leading into an internal cylindrical cavity defined by the sidewall having a cylindrical interior surface;

a cylindrical inner cap having an upper endwall, a cylindrical sidewall extending down from the upper endwall to an open lower end, the open lower end leading to an internal threaded cylindrical cavity defined by the cylindrical sidewall having a cylindrical interior surface, wherein the internal threaded cavity can threadingly receive a threaded cylindrical end of an access valve, wherein the inner cap captively resides within the internal cavity of the outer cap with a radial clearance between the cylindrical sidewall of the inner cap and the cylindrical sidewall of the internal cavity of the outer cap sufficient to enable free rotation of the inner cap within the internal cavity of the outer cap, wherein the upper endwall of the inner cap further comprises a keyhole, wherein the keyhole is radially off-set from the center of the upper endwall of the inner cap, wherein the keyhole is accessible through the opening in the upper endwall of the outer cap; and a tool for manipulating the inner cap, wherein the tool is configured for manipulating the inner cap by engaging the inner cap through the opening in the upper endwall of the outer cap.

24. The tamper-resistant cap system of claim 23, wherein the tool comprises a hub, base and key pin extending from the base and radially off-set from the center of the base, wherein the tool is a single unitary piece.

25. The tamper-resistant cap system of claim 24, wherein the hub of the tool comprises a textured surface so as to allow a user to grip the tool and apply a rotational force thereto.

26. The tamper-resistant cap assembly of claim 23, wherein the keyhole comprises a recessed cylindrical cavity in the upper endwall of the inner cap.

27. The tamper-resistant cap system of claim 24, wherein the base of the tool is a cylindrical structure extending from the hub, wherein the base is configured to slidingly engage the opening of the upper endwall of the outer cap and abut against the upper endwall of the inner cap, wherein the base of the tool is rotatable freely when engaged with the opening of the upper endwall of the outer cap and when a rotational force is applied to the hub of the tool.

28. The tamper-resistant cap system of claim 27, wherein the key pin is slidingly engageable with the key hole of the upper endwall of the inner cap, whereby the tool and inner cap are matingly engageable such that application of a rotational force to the tool translates the rotational force to the inner cap thereby allowing the inner cap to be manipulated to screw the inner cap onto or off of the threaded end of an access valve.

29. The tamper-resistant cap system of claim 24, wherein the key hole is a recessed cylindrical cavity of sufficient depth and circumference to receive the key pin.

\* \* \* \* \*